US010079998B2

(12) United States Patent
Nakase et al.

(10) Patent No.: US 10,079,998 B2
(45) Date of Patent: Sep. 18, 2018

(54) COMMODITY PROMOTION SYSTEM AND NON-TRANSITORY COMPUTER-READABLE MEDIUM STORING PROGRAM THEREFOR

(71) Applicant: NEC CORPORATION, Tokyo (JP)

(72) Inventors: Koichiro Nakase, Tokyo (JP); Wataru Hattori, Tokyo (JP)

(73) Assignee: NEC CORPORATION, Mintao-ku, Tokyo (JP)

( * ) Notice: Subject to any disclaimer, the term of this patent is extended or adjusted under 35 U.S.C. 154(b) by 105 days.

(21) Appl. No.: 14/441,747

(22) PCT Filed: Sep. 24, 2013

(86) PCT No.: PCT/JP2013/005633

§ 371 (c)(1),
(2) Date: May 8, 2015

(87) PCT Pub. No.: WO2014/087563

PCT Pub. Date: Jun. 12, 2014

(65) Prior Publication Data

US 2015/0304611 A1 Oct. 22, 2015

(30) Foreign Application Priority Data

Dec. 4, 2012 (JP) ................................ 2012-265536

(51) Int. Cl.
*H04N 7/18* (2006.01)
*G06Q 30/06* (2012.01)
(Continued)

(52) U.S. Cl.
CPC ........... *H04N 7/18* (2013.01); *G06K 7/10366* (2013.01); *G06K 7/10415* (2013.01);
(Continued)

(58) Field of Classification Search
CPC ............. G06Q 10/087; G06Q 30/0267; G06Q 20/208; G06Q 20/203; G06Q 30/0201;
(Continued)

(56) References Cited

U.S. PATENT DOCUMENTS 7,271,724 B2 9/2007 Goyal et al.
2004/0181467 A1* 9/2004 Raiyani ................ G06Q 10/087
705/28

(Continued)

FOREIGN PATENT DOCUMENTS

JP 11-328266 A 11/1999
JP 2003-114273 A 4/2003

(Continued)

OTHER PUBLICATIONS

International Search Report for PCT/JP2013/005633 dated Dec. 3, 2013 [PCT/ISA/210].

(Continued)

*Primary Examiner* — Obafemi Sosanya
(74) *Attorney, Agent, or Firm* — Sughrue Mion, PLLC

(57) ABSTRACT

A commodity promotion system includes output unit that presents a customer with information, commodity presence/absence determination unit that determines presence or absence of the target article on the basis of signal strength information of the RF tag, commodity information storage unit that stores commodity information list in which the tag information of the RF tag, commodity presence/absence information indicating presence or absence of the target article, output unit ID information of the output unit, and output information indicating information to be presented are associated with one another, and commodity pickup determination unit that detects that the target article has changed from a presence state to an absence state, on the basis of a determination result of the presence or absence of the target article and the commodity presence/absence information in the commodity information list and outputs the output information associated with the tag information to the output unit.

11 Claims, 17 Drawing Sheets

1

(51) Int. Cl.

| | |
|---|---|
| ***G06K 7/10*** | (2006.01) |
| ***G06Q 30/02*** | (2012.01) |
| ***G06Q 10/08*** | (2012.01) |
| *G06K 17/00* | (2006.01) |

(52) U.S. Cl.
CPC ....... *G06Q 10/087* (2013.01); *G06Q 30/0255* (2013.01); *G06Q 30/06* (2013.01); *G06K 2017/0051* (2013.01); *G06K 2017/0067* (2013.01)

(58) Field of Classification Search
CPC ........... G06Q 30/0631; G06Q 10/0833; G06Q 30/0255; G06K 7/10336; G06K 2017/0067; H04N 7/18
See application file for complete search history.

(56) References Cited

U.S. PATENT DOCUMENTS

| | | | | |
|---|---|---|---|---|
| 2005/0012613 | A1 | 1/2005 | Eckstein et al. | |
| 2005/0211768 | A1* | 9/2005 | Stillman | G07F 11/00 235/381 |
| 2008/0052037 | A1* | 2/2008 | Bodin | G06Q 10/087 702/173 |
| 2013/0080279 | A1* | 3/2013 | Daily | A47F 9/047 705/23 |
| 2015/0041535 | A1 | 2/2015 | Daily et al. | |

FOREIGN PATENT DOCUMENTS

| | | | |
|---|---|---|---|
| JP | 2005-10608 | A | 1/2005 |
| JP | 2007-504571 | A | 3/2007 |
| JP | 2007-241806 | A | 9/2007 |
| JP | 2008-537825 | A | 9/2008 |
| JP | 2009-110236 | A | 5/2009 |
| JP | 2010-37075 | A | 2/2010 |
| JP | 2010-211451 | A | 9/2010 |
| JP | 2012-235204 | A | 11/2012 |
| WO | 2006/104587 | A2 | 10/2006 |
| WO | 2014/041715 | A1 | 3/2014 |

OTHER PUBLICATIONS

Decision to Grant a Patent dated Jan. 10, 2017 issued by the Japanese Patent Office in counterpart application No. 2014-550891.

* cited by examiner

| TAG INFORMATION | COMMODITY PRESENCE/ABSENCE INFORMATION | COMMODITY IDENTIFICATION INFORMATION | OUTPUT UNIT ID INFORMATION | OUTPUT INFORMATION |
|---|---|---|---|---|
| 0501 | PRESENCE | COMMODITY A | 0001 | A-1 |
| 0502 | ABSENCE | COMMODITY A | 0001 | A-1 |
| 0503 | ABSENCE | COMMODITY B | 0001 | B-1 |
| 1002 | ABSENCE | COMMODITY C | 0002 | C-1 |
| 1003 | PRESENCE | COMMODITY D | 0002 | D-1 |
| ... | ... | ... | ... | ... |

Fig. 4

| DISTANCE Y | 1/4·(λ/2π) ≒0.04λ | 1/2·(λ/2π) ≒0.08λ | λ/2π ≒0.16λ | 2·(λ/2π) ≒0.32λ | λ | 2λ |
|---|---|---|---|---|---|---|
| WHEN 950 MHz | 1.3cm | 2.5cm | 5.0cm | 10.1cm | 31.6cm | 63.2cm |
| QUASI-STATIC ELECTRIC FIELD $(1/Y^3)$ | 64 | 8 | 1 | 1/8≒0.13 | ≒0.004 | $≒5\times10^{-4}$ |
| INDUCED ELECTRIC FIELD $(1/Y^2)$ | 16 | 4 | 1 | 1/4≒0.13 | ≒0.025 | $≒6\times10^{-3}$ |
| RADIATED ELECTRIC FIELD $(1/Y)$ | 4 | 2 | 1 | 1/2≒0.5 | ≒0.16 | ≒0.08 |

Fig. 8

| TAG INFOR-MATION | COMMODITY PRESENCE/ ABSENCE INFORMATION | COMMODITY IDENTIFI-CATION INFORMATION | OUTPUT UNIT ID INFOR-MATION | CAMERA ID INFOR-MATION | OUTPUT INFORMATION | | | | | |
|---|---|---|---|---|---|---|---|---|---|---|
| | | | | | MALES | | | FEMALES | | |
| | | | | | 50s OR HIGHER | 20s TO 40s | 10s | 50s OR HIGHER | 20s TO 40s | 10s |
| 0501 | PRESENCE | COMMODITY A | 0001 | 0001 | A-m-50 | A-m-20 | A-m-10 | A- f -50 | A-f-20 | A-f-10 |
| 0502 | ABSENCE | COMMODITY B | 0001 | 0001 | B-m-50 | B-m-20 | B-m-10 | B-f-50 | B-f-20 | B-f-10 |
| 0503 | ABSENCE | COMMODITY C | 0001 | 0001 | C-m-50 | C-m-20 | C-m-10 | C-f-50 | C-f-20 | C-f-10 |
| 1002 | ABSENCE | COMMODITY D | 0002 | 0002 | D-m-50 | D-m-20 | D-m-10 | D-f-50 | D-f-20 | D-f-10 |
| 1003 | PRESENCE | COMMODITY E | 0002 | 0002 | E-m-50 | E-m-20 | E-m-10 | E-f-50 | E-f-20 | E-f-10 |
| . . . | . . . | . . . | . . . | . . . | . . . | . . . | . . . | . . . | . . . | . . . |

Fig. 12

COMMODITY PROMOTION SYSTEM AND NON-TRANSITORY COMPUTER-READABLE MEDIUM STORING PROGRAM THEREFOR

CROSS REFERENCE TO RELATED APPLICATIONS

This application is a National Stage of International Application No. PCT/JP2013/005633, filed on Sep. 24, 2013, which claims priority from Japanese Patent Application No. 2012-265536, filed on Dec. 4, 2012, the contents of all of which are incorporated herein by reference in their entirety.

TECHNICAL FIELD

The present invention relates to a commodity promotion system and program. In particular, the invention relates to a commodity promotion system which is responsive to a customer picking up a commodity, and a non-transitory computer-readable medium storing a program for the commodity promotion system.

BACKGROUND ART

One of the traditional commodity promotion methods is to show promotion video on a display (electronic POP terminal, etc.) installed on a showcase and including a memory card or DVD to advertise commodities to customers. In this method, however, promotion information is only shown to customers unilaterally and does not change. Accordingly, customers do not necessarily give attention to such information. In recent years, there have been considered methods of, in response to the behavior of a customer, providing information to the customer using IT technology to attract the attention of the customer. One of specific methods being considered involves detecting that a customer has picked up a commodity and displaying information related to the commodity on an electronic POP terminal.

Known examples of the method of detecting that a customer has picked up a commodity include a method of attaching RF tags disclosed in Patent Literature 1 to commodities and using a phenomenon in which when a customer picks up a commodity, tag information is read. However, this RFID system usage method has the following problems.

A first problem is that the tag information of an RF tag may be read illegally. For example, if RF tags are used to manage commodities on a showcase at a retail store, a third party other than a consumer (customer) who is about to purchase one commodity or a store clerk who is involved in commodity management can read the tag information of an RF tag attached to the commodity. The third party can, for example, associate the commodity which the customer is about to purchase or has purchased, with the customer, resulting in a privacy violation problem.

A second problem is that an RF tag is costly. While the per-unit cost of UHF-band tags is currently being reduced to levels less than 10 yen, this cost is higher by about double digits than, for example, barcodes, which are also being used to manage articles, particularly, commodities. For this reason, it is difficult to attach an RF tag to an article whose cost is approximately 1000 yen or less, in terms of cost.

Patent Literature 1 discloses a technology for coping with these problems. As with the above RFID system usage method, the technology of Patent Literature 1 aims to manage articles. More specifically, Patent Literature 1 relates to a smart shelf using an RFID system, more specifically, to a technology for monitoring the presence or absence of articles on a shelf.

In Patent Literature 1, multiple RF tags are disposed on a shelf, and managed (hereinafter referred to as "target articles") are placed in such a manner that the target articles hinder an RFID reader from reading the RF tags disposed on the shelf. Specifically, in Patent Literature 1, the target articles are placed between the RF tags and an antenna included in the RFID reader. In Patent Literature 1, the number of articles is monitored according to the following procedure.

(a) The RFID reader emits electromagnetic waves toward the shelf.

(b) The RFID reader measures the number of RF tags whose tag information it cannot read due to the presence of articles corresponding to the RF tags.

(c) The RFID reader determines the number of articles on the basis of the information obtained in (b).

Note that when the articles are placed between the reader and tags, the RF tags are adjusted so that the articles hinder the reader from reading the tags.

According to the technology of Patent Literature 1, when one target article is placed between the RFID reader and a corresponding RF tag, that is, the target article is present on the shelf, the article blocks the line of sight between the RF tag and RFID reader. Thus, the RFID reader is hindered from reading the tag information of the RF tag. That is, when target articles are present, the RFID reader cannot read the tag information of RF tags corresponding to the articles and thus can detect that target articles are present. On the other hand, when one target article is absent on the shelf, that is, the target article is not placed between the RFID reader and a corresponding RF tag, there is no target article which blocks the line-of-sight between the RF tag and RFID reader. Accordingly, the RFID reader can read the tag information of the RF tag and thus can detect that the article is absent. As seen above, Patent Literature 1 can detect the presence or absence of the articles and thus can manage the articles on the shelf. Note that articles that can be managed must contain a metal, water, or the like, which hinders transmission of energy with a radio frequency.

According to the technology of Patent Literature 1, the RF tags are not attached to the target articles but left on the shelf. Thus, a third party is prevented from illegally reading the tag information of an RF tag attached to any target article, thereby preventing privacy violation or information security problem. This is, the technology of Patent Literature 1 does not cause illegal reading of the tag information of a RF tag by a third party, which is the first problem. Further, the technology of Patent Literature 1 allows the RF tags to be used repeatedly, since the RF tags are not attached but left on the shelf. Thus, the per-article tag cost substantially becomes a value obtained by dividing the tag cost by the number of times the tag is used. That is, according to the technology of Patent Literature 1, the problem that an RF tag is costly, which is the second problem, is solved by using the tag a sufficient number of times.

CITATION LIST

Patent Literature

[Patent Literature 1] U.S. Pat. No. 7,271,724

SUMMARY OF INVENTION

Technical Problem

In the technology of Patent Literature 1, the articles to be managed are placed between an RFID reader and RF tags.

Accordingly, in the technology of Patent Literature 1, the positions of the target articles are limited to between the RFID reader and RF tags. Further, in the technology of Patent Literature 1, the RFID reader must be disposed away from the shelf having the RF tags thereon so that the RFID reader can ensure a wide cover area in order to manage the multiple articles. That is, a reader antenna, which is part of the RFID reader, is also disposed away from the shelf. This is because the reader antenna of a commonly used RFID reader is designed such that it serves as the source of uniform radio waves in the far field. Accordingly, introducing a system using the technology of Patent Literature 1 requires ensuring wide space between the RFID reader and RF tags so that radio waves can be propagated therebetween for communication.

That is, in the technology of Patent Literature 1, a sufficient distance is ensured between the shelf, target articles, and RF tags, and the reader antenna of the RFID reader. The reader antenna, which is sufficiently smaller than the shelf, emits radio waves.

In this case, when a purchaser enters between the reader antenna and a region having one commodity thereon, the reader antenna can no longer read the tag information of an RF tag corresponding to the commodity as if the commodity were present. That is, although the commodity is absent, the reader antenna falsely detects that the commodity is present. Further, since the positions of commodities tend to be covered by the shadows of customers, this technology is difficult to use as a system which promotes commodities by detecting that a customer has picked up a commodity.

An object of the present invention is to provide a commodity promotion system and program which solve these problems.

Solution to Problem

A first exemplary aspect of the present invention is a commodity promotion system comprising: detection unit comprising: a showcase where an RF tag is disposed between a reader antenna and a target article placement region having a target article placed thereon; and an RFID reader that reads management information from the RF tag through the reader antenna, the management information including signal strength information of a response signal output by the RF tag and tag information of the RF tag; output unit that presents a customer with information; commodity presence/absence determination unit that determines presence or absence of the target article on the basis of the signal strength information in the management information; commodity information storage unit that stores commodity information list in which the tag information, commodity presence/absence information indicating presence or absence of the target article, output unit ID information for identifying the output unit, and output information indicating information to be presented are associated with one another; and commodity pickup determination unit that detects that the target article has changed from a presence state to an absence state, on the basis of a determination result of the presence or absence of the target article and the commodity presence/absence information in the commodity information list and outputs the output information associated with the tag information to the output unit.

Another exemplary aspect of the present invention is in a commodity promotion system including detection unit, arithmetic unit, storage unit, and output unit, the detection unit including a showcase where an RF tag is disposed between a reader antenna and a target article placement region having a target article placed thereon; and an RFID reader that reads management information from the RF tag through the reader antenna, the management information including signal strength information of a response signal output by the RF tag and tag information of the RF tag, a non-transitory computer-readable medium storing a program executed by the arithmetic unit, the program: determines presence or absence of the target article on the basis of the signal strength information in the management information; refers to commodity information list stored in the storage unit, the commodity information list being commodity information list in which the tag information, commodity presence/absence information indicating presence or absence of the target article, output unit ID information for identifying the output unit, and output information indicating information to be presented are associated with one another; detects that the target article has changed from a presence state to an absence state, on the basis of a determination result of the presence or absence of the target article and the commodity presence/absence information in the commodity information list; outputs the output information associated with the tag information to the output unit; and presents a customer with information based on the output information through the output unit.

Advantageous Effects of Invention

According to the present invention, there can be provided a commodity promotion system which typically detects that a customer has picked up a commodity and provides the customer with information related to the commodity while improving security on commodity purchase, and a non-transitory computer-readable medium storing a program therefor.

BRIEF DESCRIPTION OF DRAWINGS

FIG. 4 is a schematic view of a commodity information list used in the commodity promotion system according to the first exemplary embodiment;

FIG. 8 is a table indicating the dependence of the relative strengths of the quasi-static electric field, induced electric field, and radiated electric field in the electric field $E_\theta$ on the distance r which is standardized by the wavelength $\lambda$;

FIG. 12 is a schematic view of a commodity information list used in the commodity promotion system according to the second exemplary embodiment;

DESCRIPTION OF EMBODIMENTS

First Exemplary Embodiment

Now, exemplary embodiments of the present invention will be described with reference to the drawings. In the following description, multiple elements of the same type are described. When representing such elements collectively, reference signs consisting of only numbers are used; when representing such elements individually, reference signs consisting of numbers and alphabets are used.

Figure 1:
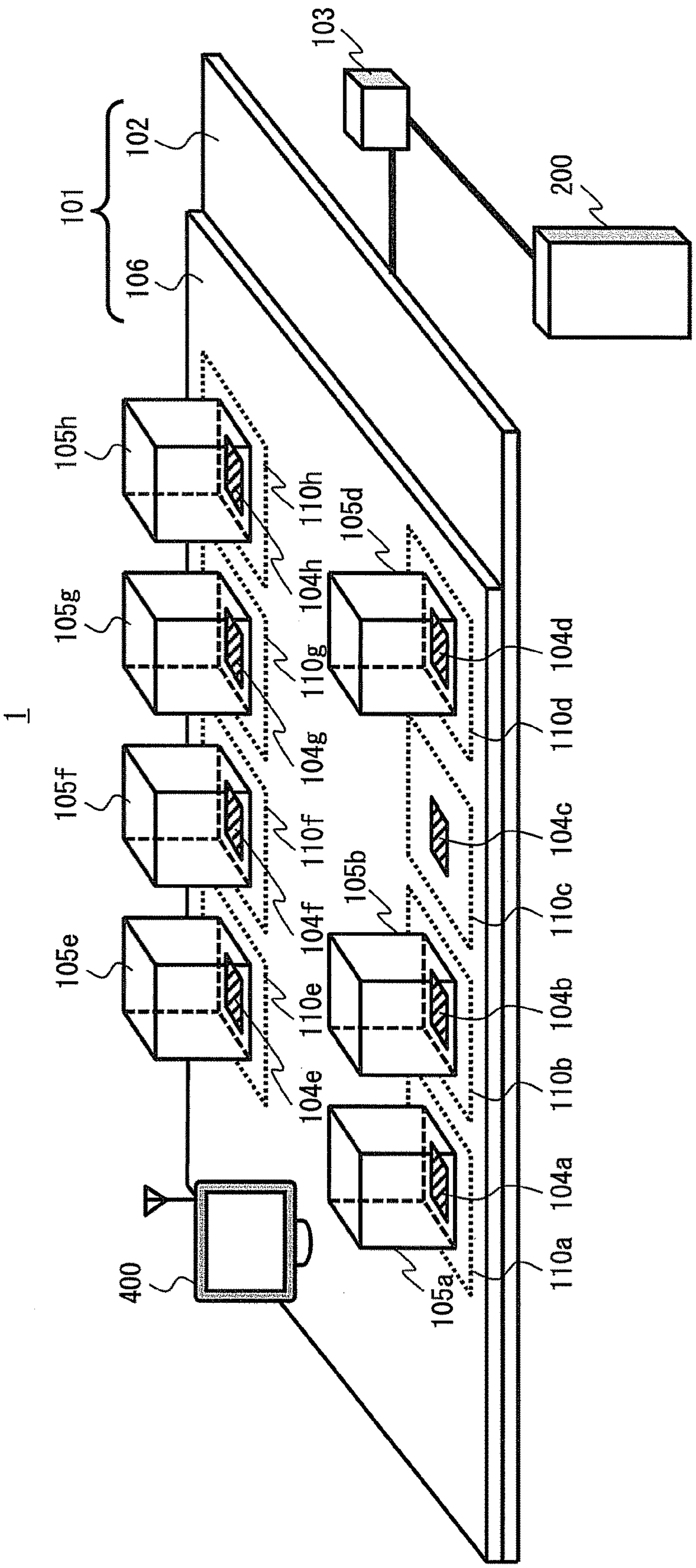
FIG. 1 is a schematic view of a commodity promotion system according to a first exemplary embodiment.

FIG. 1 shows a schematic view of a commodity promotion system 1 according to a first exemplary embodiment. As shown in FIG. 1, the commodity promotion system 1 according to the first exemplary embodiment includes a showcase 101, an RFID reader 103, RF tags 104, an output unit 400, and a customer behavior analysis apparatus 200. In the commodity promotion system 1 according to the first exemplary embodiment, the showcase 101, RFID reader 103 and RF tags 104 form a detection unit. The showcase 101 includes a reader antenna 102 and a spacer 106. Target article placement regions 110 surrounding the RF tags 104, respectively, are defined on the showcase 101. The output unit 400 presents customers with information on the basis of output information provided by the customer behavior analysis apparatus 200. The output unit 400 includes an information presentation unit including a display device (display, electronic POP terminal, or projector), a speaker, and a lighting system. The output unit 400 can communicate with the customer behavior analysis apparatus 200 through communication unit, for example, a wireless LAN or the like. While the output unit 400 is placed on the upper surface of the showcase 101 in an example shown in FIG. 1, it may be disposed in other positions. The output unit 400 may be disposed in any position as long as the position is adjacent to associated commodities and falls within the viewing range of customers.

In the example shown in FIG. 1, the commodity promotion system 1 according to the first exemplary embodiment includes RF tags 104*a* to 104*h* and target article placement regions 110*a* to 110*h*. Further, in the example shown in FIG. 1, target articles 105 are placed in the target article placement regions 110 except for the target article placement region 110*c*. That is, in the example shown in FIG. 1, by using the customer behavior analysis apparatus 200, the commodity promotion system 1 determines that the target articles 105*a*, 105*b*, and 105*d* to 105*h* are present and that the target article 105*c* is absent and gathers information about the presence or absence of the target articles along with information about the time when the state of any target article has changed.

The commodity promotion system 1 will be described in more detail below. As described above, the detection unit includes the showcase 101, RFID reader 103, and RF tags 104. The showcase 101 is installed on a table, rack, or the like and includes the reader antenna 102 and spacer 106. In the commodity promotion system 1, the RF tags 104 are disposed between the reader antenna 102 and the target article placement regions 110 having the target articles placed thereon. The RF tags 104 transmit or receive data to or from the reader antenna 102 using UHF-band signals. The RFID reader 103 reads, from each RF tag 104, management information including the signal strength information of a response signal output by the RF tag 104 and the tag information of the RF tag 104 through the reader antenna 102. The spacer 106 is used to set the distance L1 between each RF tag 104 and a corresponding target article 105 and the distance L2 between each RF tag 104 and reader antenna 102. Details will be described later. In the commodity promotion system 1 according to the first exemplary embodiment, the distances L1 and L2 are set such that L1<L2. The spacer 106 is formed of a dielectric.

Each RF tag 104 includes a tag antenna. By disposing the RF tags 104 in the positions described above, the tag antennas and the corresponding target articles are electromagnetic-field-coupled in a state in which the target articles are placed on the corresponding target article placement regions. The reader antenna 102 is an open transmission line which is matched-terminated. By disposing it as described above, the reader antenna 102 is disposed in a position in which it is electromagnetic-field-coupled with the tag antennas and thus can transmit or receive radio signals to or from the RF tags.

Figure 2:
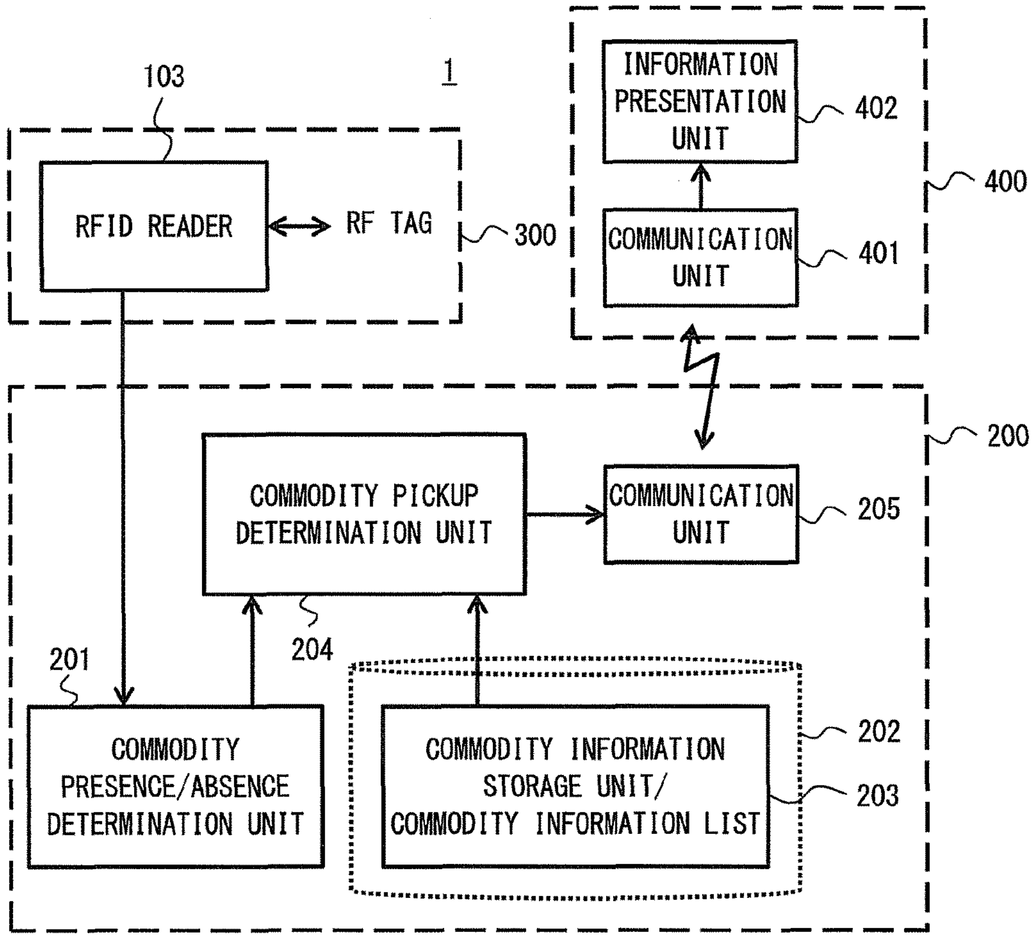
FIG. 2 is a block diagram of the commodity promotion system according to the first exemplary embodiment.

Next, the detailed configuration of the commodity promotion system 1 according to the first exemplary embodiment will be described focusing on the customer behavior analysis apparatus 200 thereof. FIG. 2 shows a block diagram of the commodity promotion system 1 according to the first exemplary embodiment.

As shown in FIG. 2, the commodity promotion system 1 includes the customer behavior analysis apparatus 200, a detection unit 300, and the output unit 400. While the detection unit 300 includes the RFID reader 103, showcase 101, and RF tags 104, FIG. 2 shows only the RFID reader 103, which transmits management information to the customer behavior analysis apparatus 200, of the elements of the detection unit 300.

The customer behavior analysis apparatus 200 is, for example, an arithmetic device including an arithmetic unit, such as a computer, and a storage unit. The customer behavior analysis apparatus 200 promotes commodities on the basis of a commodity promotion program executed by the arithmetic unit.

The above program can be stored in various types of non-transitory computer-readable media and provided to the computer. Examples of the non-transitory computer-readable media include various types of tangible storage media. Examples of the non-transitory computer-readable media include magnetic storage media (e.g., flexible disks, magnetic tapes, hard disk drives), optico-magneto storage media (e.g., optico-magneto disks), compact disk read-only memory (CD-ROM), compact disc recordable (CD-R), CD-R/W, semiconductor memory (e.g., mask ROM, PROM (programmable ROM), erasable PROM (EPROM), flash ROM, and random access memory (RAM). The program may be provided to the computer by various types of transitory computer-readable media. Examples of the transitory computer-readable media include electric signals, optical signals, and electromagnetic waves. The transitory computer-readable media can provide the program for the computer through a wire communication path such as an electric line or optical fiber, or a wireless communication path.

The customer behavior analysis apparatus 200 includes a commodity presence/absence determination unit 201 and a commodity information storage unit 203. The commodity presence/absence determination unit 201 is implemented by the arithmetic unit, which executes the commodity promotion program. The commodity information storage unit 203 is implemented as part of a storage unit 202. The commodity information storage unit 203 stores a commodity information list in which the tag information of each RF tag, output unit ID information for identifying the output unit 400, which presents information to customers, the position information of the corresponding target article placement region, and output information indicating information to be presented are associated with one another. In the first exemplary embodiment, commodity identification information for identifying each target article is also stored in the commodity information list along with the above information in such a manner that the commodity identification information is associated with other information.

The commodity presence/absence determination unit 201 determines the presence or absence of each target article on the basis of the signal strength information in the management information. If signal strength indicated by the signal strength information is lower than a preset threshold, the commodity presence/absence determination unit 201 determines that the target article is in a presence state; if the signal strength is greater than or equal to the preset threshold, it determines that the target article is in an absence state.

A commodity pickup determination unit 204 detects that the target article has changed from a presence state to an absence state, on the basis of the determination result of the presence or absence of the target article and the corresponding commodity presence/absence information in the commodity information list and outputs output information associated with the corresponding tag information.

A communication unit 205 outputs the output information provided by the commodity pickup determination unit 204 to the output unit 400. The output unit 400 includes a communication unit 401 and an information presentation unit 402. The communication unit 401 receives the output information from the communication unit 205 of the customer behavior analysis apparatus 200 and outputs it to the information presentation unit 402. The information presentation unit 402 presents the customer with information based on the output information provided by the communication unit 401. The information presentation unit 402 may present information by various unit, including only by video, only by audio, and by both video and audio.

Figure 3:
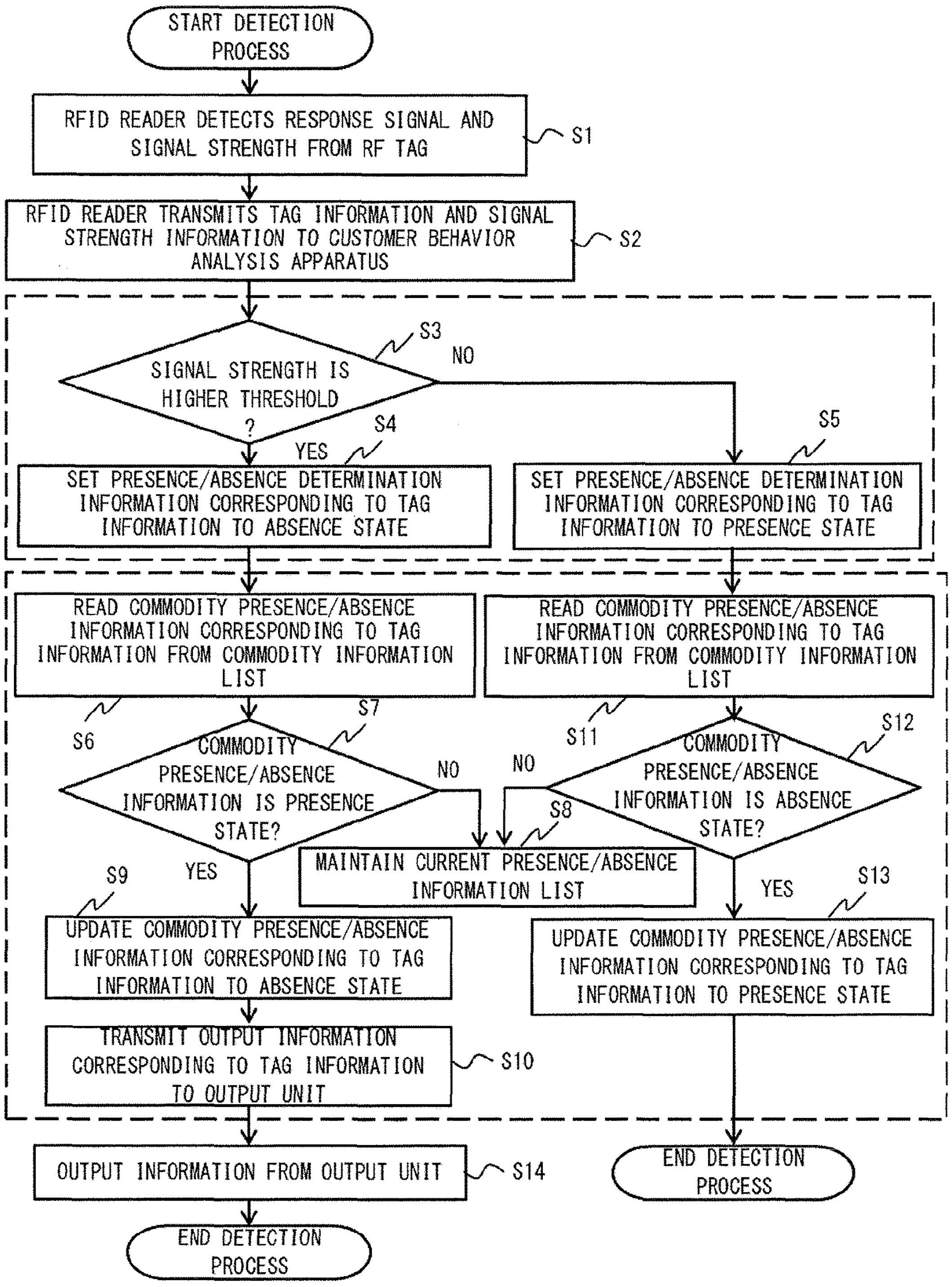
FIG. 3 is a flowchart showing the operation of the commodity promotion system according to the first exemplary embodiment.

Next, an operation of the commodity promotion system 1 according to the first exemplary embodiment will be described. FIG. 3 shows a flowchart showing the operation of the commodity promotion system 1 according to the first exemplary embodiment. As shown in FIG. 3, in a detection operation of the commodity promotion system 1, first, the RFID reader 103 transmits tag information read commands serving as transmission signals to the RF tags 104 through the reader antenna 102. Then, each RF tag 104 receives the transmission signal through the reader antenna 102. The RF tag 104 then generates power using part of the received signal and starts an operation. The RF tag 104 then decodes the received signal to reproduce reception data included in the signal. The RF tag 104 then refers to this reception data and tag information in a storage circuit of the RF tag and transmits a modulation signal serving as a response signal to the reader antenna 102. Note that if this response signal coincides with that of another tag, that is, the response signal collides with another, the RF tag 104 retransmits a response signal in accordance with a predetermined protocol. The protocol may be a protocol standardized by ISO or the like.

The operation of the commodity promotion system 1 will be described in more detail below with reference to the flowchart of FIG. 3. The RFID reader 103 receives the response signal from the RF tag 104 through the reader antenna 102 and detects, from the received signal, the signal strength and the tag information of the RF tag 104 (step S1). The RFID reader 103 then transmits the detected tag information and a result of signal strength of the RF tag 104 to the customer behavior analysis apparatus 200 (step S2).

Subsequently, the commodity presence/absence determination unit 201 of the customer behavior analysis apparatus 200 performs steps S3 to S5. That is, the commodity presence/absence determination unit 201 compares the signal strength of the RF tag 104 with the predetermined threshold (step S3). If the signal strength is lower (weaker) than the threshold, it determines that a commodity corresponding to the RF tag 104 is present (NO branch in step S3) and sets the presence/absence determination information corresponding to the tag information to a presence state (step S5). If the signal strength is equal to or higher (stronger) than the threshold, it determines that the commodity is absent (YES branch in step S3) and sets the presence/absence determination information corresponding to the tag information to an absence state (step S4).

The above signal strength determination is preferably performed as follows. That is, the tag information of an RF tag 104 which has responded within a predetermined time is compared to a list of the tag information of the previously disposed RF tags 104 and it is confirmed that the RF tag 104 is a tag for commodity detection; then, the signal strength of the confirmed RF tag 104 is compared to the predetermined threshold and, if the signal strength is lower (weaker) than the threshold, a commodity corresponding to the RF tag 104 is determined to be present and, if the signal strength is higher (stronger) than or equal to the threshold, the commodity is determined to be absent. Note that if multiple response signals are received from the RF tag 104 within the predetermined time, the average signal strength of the multiple response signals is used as the signal strength of the RF tag 104. The predetermined time is preferably set to within a range from 0.1 to 5 sec, during which it can be detected that a customer has picked up a commodity. More preferably, the predetermined time is set to within a range from 0.3 sec, from which tag read errors due to collision can be suppressed, to 1 sec, by which a response is sharply made to a human behavior. Depending on the strength of the electromagnetic-field coupling between the commodity and tag antenna, the RF tag 104 may not operate. Or, even when the RF tag 104 operates, if the response signal returned to the RFID reader 103 is too weak, the RFID reader 103 may not be able to read the RF tag 104 within the predetermined time. To cope with these cases, when the tag information of an RF tag 104 which has responded within the predetermined time is compared to the list of the tag information of the previously disposed RF tags 104, undetected RF tags 104 are also identified. The signal strengths of the identified undetected RF tags 104 are regarded as being lower (weaker) than the predetermined threshold and then commodities corresponding to the undetected RF tags 104 are determined to be present.

Subsequently, the commodity pickup determination unit 204 of the customer behavior analysis apparatus 200 performs steps S6 to S13. That is, if the target article 105 corresponding to the RF tag 104 is determined to be absent (step S4), the commodity pickup determination unit 204 reads the commodity presence/absence information of the target article 105 associated with the tag information of the RF tag 104 from the commodity information list stored in the commodity information storage unit 203 (step S6). If the read commodity presence/absence state is a presence state (YES branch in step S7), the commodity pickup determination unit 204 updates the commodity presence/absence information corresponding to the tag information to an absence state (step S9). In contract, if the read commodity presence/absence state is an absence state in step S7 (NO branch in step S7), the commodity pickup determination unit 204 maintains the commodity presence/absence information corresponding to the tag information without updating it (step S8). After step S9, the commodity pickup determination unit 204 retrieves output information associated with the picked-up target article 105 (the tag information of the RF tag 104) from the commodity information list stored in the commodity information storage unit 203 and then transmits the output information to the output unit 400 through the communication unit 205 (step S10). The output unit 400 receives the output information at the communication unit 401 and outputs information associated with the picked-up commodity from the information presentation unit 402 (step S14).

If the target article 105 corresponding to the RF tag 104 is determined to be present (step S5), the communication unit 205 reads the commodity presence/absence information of the target article 105 associated with the tag information of the RF tag 104 from the commodity information list stored in the commodity information storage unit 203 (step S11). If the read commodity presence/absence state is an absence state (YES branch in step S12), the commodity pickup determination unit 204 updates the commodity presence/absence information corresponding to the tag information to a presence state, ending the process (step S13). In contract, if the read commodity presence/absence state is a presence state in step S12 (NO branch in step S12), the commodity pickup determination unit 204 maintains the commodity presence/absence information corresponding to the tag information without updating it (step S8).

If a certain commodity is to be recommended in relation to the commodity picked up by the customer, for example, if a tea is to be recommended when a packed lunch is picked up by the customer, the output information is characters, images, advertising video, or the like indicating the tea. The output unit 400 presents the customer with the output information using an output device such as a display device (POP terminal or the like). The output device is not limited to a display device and may be, for example, a speaker. In this case, the output information is audio information and may be, for example, announcement of the trade name, sales message, music, or the like of the recommended commodity. If it is desired that the customer be informed of the location of the recommended commodity and then guided thereto, the output device is a lighting system. For example, a lighting system associated with an RF tag 104 corresponding to the recommended commodity may be flashed, or brightened or darkened, or the color thereof may be changed. Other conceivable output information includes display of the usage of the commodity and display of a two-dimensional barcode for guiding the customer to a mobile phone website.

FIG. 4 shows a schematic view of a commodity information list used in the commodity promotion system 1 according to the first exemplary embodiment. This commodity information list will be described below. Note that the commodity information list shown in FIG. 4 is only illustrative and information included in the list may be set as appropriate depending on the system.

As shown in FIG. 4, commodity presence/absence information, commodity identification information, output unit ID information, and output information are associated with tag information in the commodity information list. Tag information is, for example, a number for identifying an RF tag 104. Commodity presence/absence information indicates whether a commodity is present or absent. Commodity identification information indicates the type of a commodity corresponding to tag information. Output unit ID information indicates a number for identifying an output unit. Output information indicates the number of information to be output.

By performing the process on the basis of the above operation principle, the commodity promotion system 1 according to the first exemplary embodiment can provide a promotion system that can acquire information indicating that a customer has picked up a commodity and present the customer with information related to the picked-up commodity. This system does not require attaching tags to commodities and therefore can improve security related to commodity purchase.

The reason why the signal strength changes among response signals as described above is that the target article 105 and the tag antenna of the RF tag 104 are electromagnetic-field-coupled. Hereafter, the positional relationship among a target article 105, a corresponding RF tag 104 and the reader antenna 102 will be described in more detail.

Figure 5:
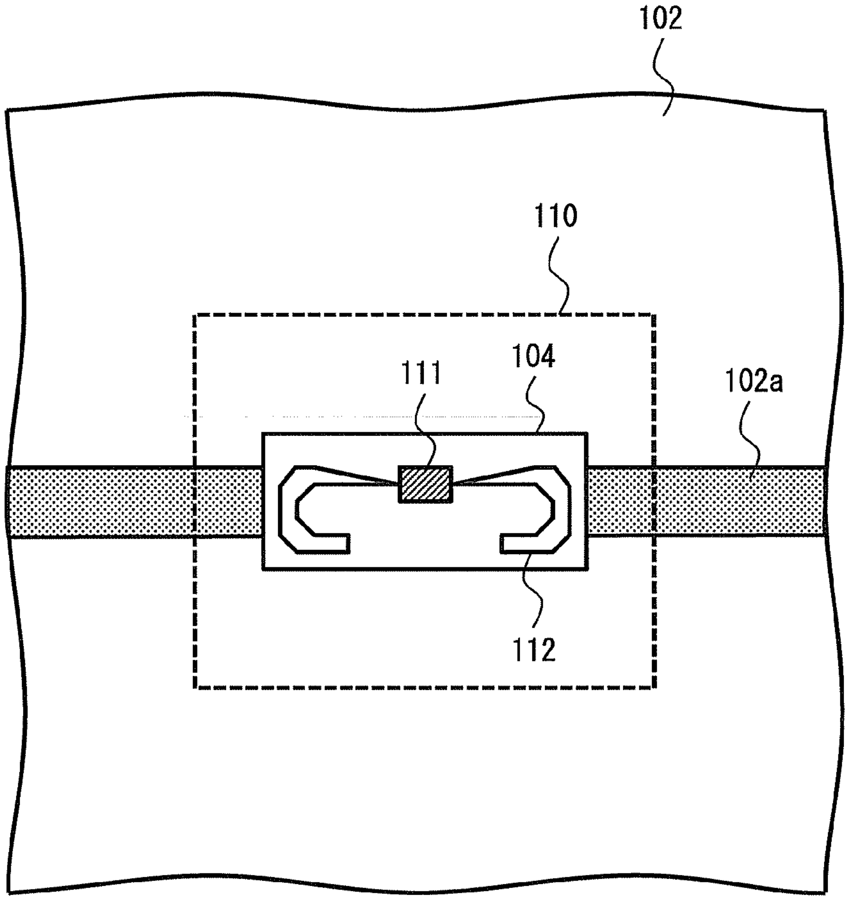
FIG. 5 is a top view of the detection unit of the commodity promotion system according to the first exemplary embodiment, which shows a placement of a target article and the positional relationship between a RF tag and a reader antenna in the commodity promotion system.
Figure 6:
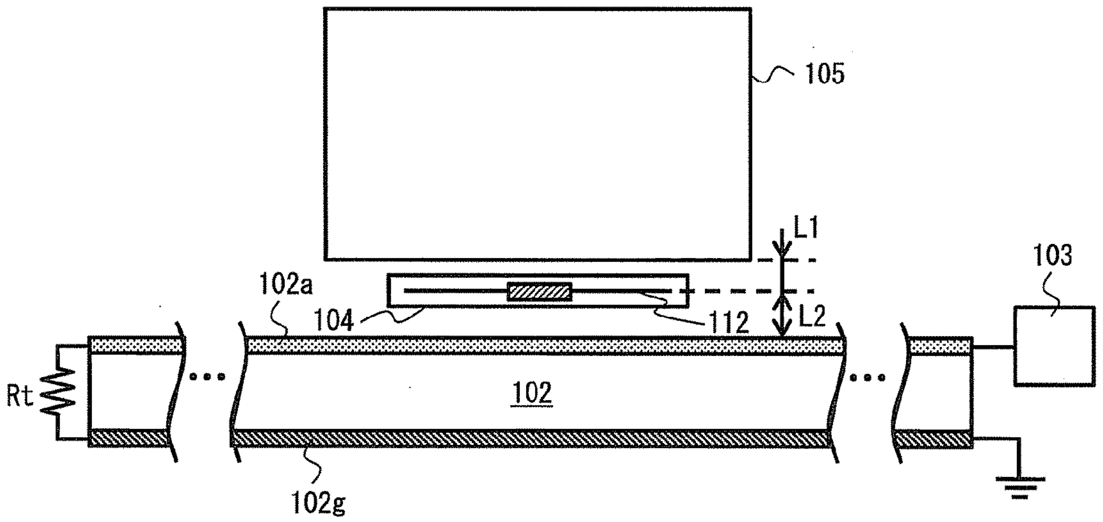
FIG. 6 is a front sectional view of the detection unit of the commodity promotion system according to the first exemplary embodiment, which shows a placement of a target article and the positional relationship between a RF tag and a reader antenna in the commodity promotion system.
Figure 7:
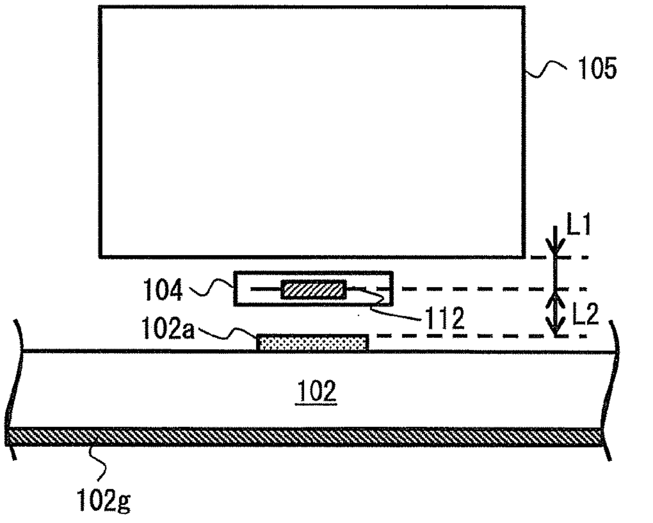
FIG. 7 is a side sectional view of the detection unit of the commodity promotion system according to the first exemplary embodiment, which shows a placement of a target article and the positional relationship between a RF tag and a reader antenna in the commodity promotion system.

FIGS. 5 to 7 show schematic views of the commodity promotion system 1 according to the first exemplary embodiment. FIG. 5 is a top view of a target article placement region in the commodity promotion system 1. The top view shown in FIG. 5 is an enlarged view of a region having one target article 105 placed thereon. As shown in FIG. 5, in the commodity promotion system 1, an RF tag 104 is disposed above the reader antenna 102. The target article placement region 110 having the target article placed thereon is set above the RF tag 104 and in a position by which the RF tag 104 is covered. The RF tag 104 includes an RFID chip 111 and a tag antenna 112. The reader antenna 102 is a traveling-wave, near-field reader antenna using a microstripline, which is a type of open transmission line.

FIG. 6 shows a front sectional view of the detection unit of the commodity promotion system 1 according to the first exemplary embodiment. As with FIG. 5, FIG. 6 shows an enlarged view of a region having one target article 105 placed thereon. As shown in FIG. 6, in the detection unit of the commodity promotion system 1, the reader antenna 102 is provided with a strip conductor **102*a* on the front surface thereof and a ground conductor 102*g* on the back surface thereof and forms a microstripline, which is a type of open transmission line. One end of the strip conductor 102*a* and the ground conductor 102*g* are connected together through a matching terminator Rt. Connected to the other end of the strip conductor 102*a* is the RFID reader 103. By making such connections, the reader antenna 102 is matched-terminated. A cover for mainly improving durability may be disposed over the strip conductor 102*a* or under the ground conductor 102*g***.

As shown in FIG. 6, the target article 105 is disposed in a position in which the distance between the target article 105 and the tag antenna 112 of the RF tag 104 is a first distance L1. The tag antenna 112 of the RF tag 104 is disposed in a position in which the distance between the tag antenna 112 and the strip conductor **102*a* of the reader antenna 102 is a second distance L2. Preferably, the first distance L1 and second distance L2 are set so that L1<L2. Thus, coupling coefficients k1 and k2 (to be discussed later) are easily set so that k1<k2. The sizes of the first distance L1 and second distance L2 are set using the spacer 106 (not shown in FIG. 6). While only the target article 105, tag antenna 112 and reader antenna 102 are shown in FIG. 6 to show the above distance relationship, for example, the RF tag 104 may be covered by a plastic plate or the like to use the thickness of the plastic plate so that the distance relationship is satisfied. Specifically, the relationship between the first distance L1 and second distance L2 may be ensured by incorporating the RF tag 104 into the plastic plate and thus forming a sheet in which the RF tag is incorporated in the plastic plate. Note that the method of forming a sheet using a plastic plate is one form for ensuring the relationship between the first distance L1 and second distance L2, and other methods may be used. For example, to ensure the second distance L2, the strip conductor 102*a* and tag antenna 112 which are in the same plane may be spaced from each other in the plane by the second distance L2**. To be more precise, the distance as used herein is preferably an electrical length which considers the shortening coefficient of wavelength. The distance as used herein is also preferably a line-of-sight distance.

FIG. 7 shows a side sectional view of the detection unit of the commodity promotion system 1 according to the first exemplary embodiment. As with FIG. 5, FIG. 7 shows an enlarged view of a region having one target article 105 placed thereon. As shown in FIG. 7, in the first exemplary embodiment, the reader antenna 102 is disposed in part of a lower portion of the RF tag 104. In the commodity promotion system 1, the RF tag 104 and target article 105 are disposed in such a manner that the relationship between the first distance L1 and second distance L2 satisfies the condition L1<L2 even in a side view.

Referring to FIGS. 5 to 7, effects obtained from the relationship among the elements of commodity promotion system 1 will be described in more detail below.

As shown in FIG. 5, in the detection unit of the commodity promotion system 1, the target article 105 is disposed above the tag antenna 112 of the RF tag 104 and in a position in which the distance between the target article 105 and tag antenna 112 is the first distance L1. The reader antenna 102, which is connected to the RFID reader 103, is disposed below the RF tag 104 in such a manner that the line-of-sight distance between the strip conductor **102*a* of the reader antenna 102 and the tag antenna 112 is the second distance L2. As seen above, in the commodity promotion system 1, the target article 105 is placed in a region other than the region between the reader antenna 102 and RF tag 104. Thus, the line-of-sight between the reader antenna 102 and tag antenna 112 is prevented from being blocked by the target article 105. Further, in the detection unit of the commodity promotion system 1, the distance between the strip conductor 102*a* of the reader antenna 102 and the tag antenna 112 is set to the second distance L2**.

As described above, in the detection unit of the commodity promotion system 1, the first distance L1 between the target article 105 and tag antenna 112 and the line-of-sight distance, the second distance L2, between the tag antenna 112 and the strip conductor **102*a* of the reader antenna 102 are adjusted. Further, in the detection unit of the commodity promotion system 1, by adjusting the first distance L1 and second distance L2, the coupling coefficient k2 between the target article 105 and tag antenna 112 and the coupling coefficient k1 between the tag antenna 112 and reader antenna 102 are adjusted. Furthermore, in the detection unit of the commodity promotion system 1, a change in the presence or absence of the target article 105 is determined based on a change in the signal strength between the tag antenna 112 and reader antenna 102 caused by a change in the coupling coefficient k2 due to the change in the presence or absence of the target article 105**.

The relationships among the first distance L1, second distance L2, and coupling coefficients k1 and k2 and effects of the commodity promotion system 1 according to the first exemplary embodiment base on the above settings will be described below. The present invention uses electromagnetic-field coupling. The coupling coefficient, which indicates the strength of electromagnetic-field coupling, can be relatively easily evaluated using an electromagnetic-field simulator. Hereafter, the region whose distance from the wave source (e.g., antenna) is shorter than $\lambda/2\pi$ where $\lambda$ represents the wavelength of a radio signal between the tag antenna 112 and reader antenna 102, and π represents the circular constant will be referred to as the reactive near-field; the region whose distance from the wave source is longer than λ/2π and shorter than λ as a radiative near-field; and the two regions collectively as the near-field region.

In the near field, the electromagnetic field strength shows complicated aspects; a quasi-static electromagnetic field, an induced electromagnetic field, and a radiated electromagnetic field exist at a non-negligible strength ratio; and the vector of the electromagnetic field, in which these fields are combined, changes spatially and temporally in various manners. As an example, if the wave source is an infinitesimal dipole antenna, an electric field E [Vim] and a magnetic field H [Aim] generated by this antenna can be represented by Formulas (1) to (4) which use a spherical coordinate system (r,θ,φ) and phasor representation.

[Formula 1]

$$E_\theta = \frac{ql}{4\pi\varepsilon}\left\{\frac{1}{r^3} + \frac{1}{r^2}\cdot\frac{1}{(\lambda/2\pi)}\cdot e^{j\frac{\pi}{2}} + \frac{1}{r}\cdot\frac{1}{(\lambda/2\pi)^2}\cdot e^{j\pi}\right\}\cdot e^{-jkr}\cdot\sin\theta \tag{1}$$

[Formula 2]

$$E_r = \frac{ql}{2\pi\varepsilon}\left\{\frac{1}{r^3} + \frac{1}{r^2}\cdot\frac{1}{(\lambda/2\pi)}\cdot e^{j\frac{\pi}{2}}\right\}\cdot e^{-jkr}\cdot\cos\theta \tag{2}$$

[Formula 3]

$$H_\phi = \frac{ql}{4\pi\sqrt{\varepsilon\mu}}\left\{\frac{1}{r^2}\cdot\frac{1}{(\lambda/2\pi)}\cdot e^{j\frac{\pi}{2}} + \frac{1}{r}\cdot\frac{1}{(\lambda/2\pi)^2}\cdot e^{j\pi}\right\}\cdot e^{-jkr}\cdot\sin\theta \tag{3}$$

[Formula 4]

$$E_\phi = H_\theta = H_r = 0 \tag{4}$$

In Formulas (1) to (4) above, q [C] represents the charge accumulated in the infinitesimal dipole antenna; l [m] represents the length of the antenna; λ [m] represents the wavelength; and r [m] represents the distance from the wave source to the observation point. Also, in Formulas (1) to (4), the term proportional to $1/r^3$ represents the quasi-static electromagnetic field; the term proportional to $1/r^2$ represents the induced electromagnetic field; and the term proportional to 1/r represents the radiated electromagnetic field. These electromagnetic-field components depend on the distance r to different degrees and therefore the relative strength changes depending on the distance r.

FIG. 8 shows a table indicating the dependence of the relative strengths of the quasi-static electric field, induced electric field, and radiated electric field in the electric field $E_\theta$ on the distance r which is standardized by the wavelength λ. Shown in the second row of the table of FIG. 8 are distances based on a free-space wavelength of 950 MHz, which is approximately the same as the ultra high frequency (UHF)-band RFID frequency permitted by the Japanese Radio Act.

The table shown in FIG. 8 reveals that the strengths of the electric field components decrease as the distance r increases and that the ratio among the components changes. In the region where r<λ/2π, the electric field strength is stronger in the order of quasi-static electric field>induced electric field>radiated electric field; in the region where r>λ/2π, the electric field strength is weaker in the order of quasi-static electric field>induced electric field>radiated electric field; in the region where r>λ, the quasi-static and induced electric fields make extremely small contributions; and in the region where r>2λ, that is, in the far field, the radiated electric field component alone virtually exists. On the other hand, in the region where r<λ, the quasi-static electric field and induced electric field make sufficient contributions, and in the region where r<λ/2π, that is, in the reactive near field, the quasi-static and induced electric fields make great contributions. Further, as seen in Formulas (1) to (4), compared to the radiated electric field, the quasi-static and induced electric fields have θ-direction components, as well as r-direction and φ-direction components, that is, these fields have components in various directions.

Typically, in the reactive near field, the quasi-static and induced electromagnetic fields remaining near the antenna are predominant, as seen above, and have high absolute strengths, compared to in the radiated field, which is radiated from the antenna into the air and propagated. In the radiative near-field, the absolute electromagnetic-field strength is typically weaker as the distance from the wave source is longer. Further, the relative strengths of the quasi-static and induced electromagnetic fields are lowered, whereas the relative strength of the radiated electromagnetic field is increased. As seen above, quasi-static and induced electromagnetic fields are present in the near field, and these fields couple between the reader antenna 102 and tag antennas 112 and between the tag antennas 112 and target articles 105.

In a typical passive RFID system, which uses the UHF band or microwave band, the distance r between the reader antenna 102 and tag antennas 112 satisfies the relationship r>λ and therefore the radiated electromagnetic field is used for communication therebetween. To efficiently generate a radiated electromagnetic field, a resonant antenna, typified by a patch antenna, is used as the reader antenna 102. When a resonant antenna is used in the near field where r<λ, the electromagnetic-field strength significantly changes among locations along the antenna due to a standing wave in the antenna. For example, the amplitude is maximized near the peak of the standing wave and becomes zero at the mid-point thereof. For this reason, when the distance r between the reader antenna 102 which is a resonant antenna and tag antennas 112 satisfies the relationship r<λ, tag antennas near the mid-point of the standing wave in the reader antenna cannot receive signals from the reader antenna or receive extremely weak signals. That is, use of a resonant antenna generates a blind spot, thereby causing faults.

In view of the foregoing, in the system of Patent Literature 1, the RFID reader must be disposed sufficiently away from the target articles 105, the shelf having the articles thereon, and the RF tags so that a wide cover area can be ensured and thus radio waves can be radiated from the reader antenna, which is sufficiently smaller than the shelf. Accordingly, the system of Patent Literature 1 must ensure wide space between the RFID reader and RF tags. Further, depending on the material of the shelf, in particular, when the shelf is made of a metallic material or the like, a multipath phenomenon may occur, causing radio-frequency interference, resulting in destabilization of tag reading. Thus, reading of tag information may be hindered, whether the articles are present or absent. Furthermore, when a human or object enters between the reader antenna and a region having an article thereon, the reader antenna is hindered from reading a tag corresponding to the article, as if the article were present. Thus, the reader antenna may falsely detect that the article is present, although the article is absent.

On the other hand, the antennas can be electromagnetic-field-coupled through the quasi-static and induced electromagnetic fields present in the near field where r<λ, preferably in the reactive near field where r<λ/2π, thereby forming a coupled circuit. In this case, there is no need to ensure wide space between the RFID reader and RF tags, as shown by these conditions. However, if a resonant antenna is simply used as the reader antenna 102, a blind spot occurs, causing faults. Further, a standing-wave antenna is typically about λ in size and therefore its cover area would be extremely narrowed when it is used adjacent to the tags.

For these reasons, in the detection unit of the commodity promotion system 1 according to the first exemplary embodiment, the reader antenna 102, which is connected to the RFID reader 103, is composed of a matched-terminated, open transmission line, and the RF tags 104 are disposed in such a manner that the open transmission line and the tag antennas 112 of the RF tags 104 are electromagnetic-field-coupled. By using the open transmission line, which emits less radio waves, as the reader antenna 102 of the RFID reader 103 in the detection unit of the commodity promotion system 1, the reader antenna 102 and tag antennas 112 are electromagnetic-field-coupled coupled through quasi-static and induced electromagnetic fields generated around the open transmission line, thereby forming a coupled circuit. That is, the open transmission line is used as a travelling-wave antenna, which operates in the near field. This configuration eliminates the need to ensure wide space between the reader antenna 102 and RF tags 104. Further, the reader antenna 102 and tag antennas 112 communicate with each other at short distances through the coupled circuit and therefore it is possible to reduce occurrence of a multipath phenomenon, as well as false detection due to entry of a human or object between the reader antenna 102 and a region having any target article 105 placed thereon. Furthermore, since the matched-terminated open transmission line is used as the reader antenna 102, the principal component of an electromagnetic wave propagating through the antenna does not generate a standing wave but rather propagates to the matched-terminal as a travelling wave. As used herein, the expression "does not generate a standing wave" precisely unit that a standing wave is sufficiently small and unit that the standing-wave ratio is typically a value equal to or smaller than 2, preferably a value equal to or smaller than 1.2.

When the terminal of the transmission line is matched with sufficient accuracy or when an electromagnetic wave propagating through the transmission line is sufficiently attenuated around the terminal, a travelling wave acts as a principal component without generating a large standing wave in the transmission line. By using such electromagnetic-field distribution in the transmission line, a travelling-wave antenna can be formed. Further, an electromagnetic field generated in space around this line includes a relatively small amount of radiated electromagnetic field and includes static and induced electromagnetic fields as principal components. The strengths of the static and induced electromagnetic fields are higher than that of the radiated electromagnetic field, and the RF tags 104 obtain higher electromagnetic-field strengths even when the reader is operating with the same output. In other words, there can be formed an environment which does not scatter a radiated electromagnetic field around while ensuring the operation of the tags.

For a standing-wave antenna such as a patch antenna, which is commonly used, the electromagnetic-field distribution around the antenna is extremely uneven due to a standing wave inside the antenna. For this reason, to avoid the blind spot, the region where the target articles 105 can be managed is limited. On the other hand, for the traveling-wave antenna composed of the open transmission line described in the present exemplary embodiment, the electromagnetic distribution does not have any unchanged portion like a node even around the antenna but rather always changes anywhere. Accordingly, the electromagnetic field does not become uneven due to the standing wave along the antenna even in the near field, thereby preventing formation of an area where the tag information of any RF tag 104 cannot be read. That is, the degree of freedom of the positions of the reader antenna 102 and tag antennas 112 is increased.

Further, in the commodity promotion system 1, the reader antenna 102 and tag antennas 112 communicate with each other using this travelling wave as a signal through the electromagnetic-field coupling. Accordingly, unlike a resonant antenna, formation of a blind spot and thus occurrence of faults are prevented. Accordingly, in the commodity promotion system 1, by extending the transmission line within the range in which the strengths of quasi-static and induced electromagnetic fields occurring around the open transmission line are sufficiently large to operate the RF tag 104*s*, regardless of the wavelength, a wider cover area can be ensured. That is, in the commodity promotion system 1 according to the first exemplary embodiment, use of the above open transmission line reduces the radiation loss of power and facilitates the expansion of the cover area.

As used herein, the term "open transmission line" refers to a transmission line which basically aims to reduce radiation and to transmit electromagnetic waves in the length direction of the line and which is an open type. Examples of the open transmission line include balanced two-wire transmission lines and transmission lines similar thereto and transmission lines such as microstrip lines, coplanar lines, and slot lines and modifications thereof such as grounded coplanar lines and triplate lines. Further, depending on the conditions, there may be used an antenna which expands in a plane shape and which transmits a signal by changing an electromagnetic field in a region sandwiched between a mesh conductor and a sheet conductor and in an outer seepage region adjacent to the mesh conductor. This antenna expanding in a plane shape includes both traveling and standing waves and also serves as a travelling-wave antenna, although incompletely. It can be used if unevenness in the electromagnetic-field distribution caused by the standing wave is negligible. On the other hand, a shielded transmission line, which does not generate an electromagnetic field as described above around a transmission line, such as a coaxial cable or waveguide, in which a transmission line is shielded, cannot be used without having the above special structure for leaking an electromagnetic field.

There is also an electromagnetic wave transmission sheet which generates an electromagnetic field in a region sandwiched between opposite conductive sheets and causes the electromagnetic field to travel in the desired direction by changing the voltage between the two conductive sheets to change the electromagnetic field or by changing the voltage between the conductive sheets on the basis of a change in the electromagnetic field. In a wider sense, this electromagnetic wave transmission sheet may be regarded as a type of the open transmission line of the present invention when seen in the length direction of the sheet. However, in the electromagnetic wave transmission sheet, the transmission coefficient fluctuates due to a standing wave in the sheet and thus the standing wave is significantly enlarged. For this reason, this sheet is not necessarily optimum for carrying out the present invention. Further, in the electromagnetic wave transmission sheet, the upper surface of the waveguide is made of a metal mesh which is sufficiently smaller than the wavelength, and it can be considered that an evanescent wave is being leaked from the upper surface. A transmission line where multiple slots for leaking an electromagnetic field are typically formed with intervals, widths, and lengths which are 1/10 or smaller the wavelength, as described above, can be regarded as a type of the open transmission line used in the detection unit of the commodity promotion system 1 according to the first exemplary embodiment.

On the other hand, there are traveling-wave antennas that radiate an electromagnetic field in the far field by using a so-called crank-line antenna, meander-line antenna, leaky coaxial cable, or the like. Antennas such as a crank-line antenna aim to obtain a predetermined radiated electromagnetic field strength by designing a crank shape to radiate an electromagnetic field from the open transmission line or by actively using an higher-order mode. Such traveling-wave antennas are different from the open transmission line used in the detection unit of the commodity promotion system 1 according to the first exemplary embodiment. In these antennas, an electromagnetic field is radiated preferentially from crank shapes or slots periodically formed with a size which is about the wavelength, typically with a size which is 1/10 or more the wavelength. Accordingly, the electromagnetic-field strength significantly changes depending on the location, as in the resonant antenna described above. Thus, when such an antenna is used in the near field, reading of tag information may be destabilized or any tag may not be read depending on the location, thereby causing faults. While the frequency assigned to a UHF-band RFID system changes among countries in the world, it is roughly distributed in a band of 860 to 960 MHz. This unit a wide width of about 10% on a fractional bandwidth basis and requires a significant change in the design of the resonance point of a resonant antenna or the cycle of cranks, meanders, or slots. On the other hand, for the commodity promotion system 1 according to the first exemplary embodiment, an open transmission line having an extremely wide band is originally used as the reader antenna 102. Accordingly, there is no need to make a particular change to this open transmission line.

In the commodity promotion system 1 according to the first exemplary embodiment, the target article placement regions 110 for placing the target articles 105 away from the RF tags 104 are defined so that the target articles 105 and RF tags 104 are electromagnetic-field-coupled. Accordingly, when one target article 105 is present, the target article 105 and a corresponding tag antenna 112 form a coupled circuit, and the resonant frequency or feeding point impedance of the tag antenna 112 changes compared to when the target article 105 is absent. Typically, a tag antenna 112 is generated so that it resonates at the resonant frequency of a signal used for communication in free space; its feeding point impedance is adjusted; and its reception sensitivity is maximized. Accordingly, the reception sensitivity of the above tag antenna 112 is reduced by the change, and the operation thereof is affected when it transmits a reflection signal to the RFID reader 103. This reduces the reception sensitivity to a signal used for communication, as well as reduces the output with which the RF tag 104 transmits a reflection signal. Accordingly, the RF tag 104 cannot receive the power of a signal from the RFID reader 103, cannot ensure the operating power of the tag due to the weakness of the received signal power, or cannot generate a reflection electromagnetic field having sufficient strength. As a result, the RFID reader 103 can no longer read the tag information of the RF tag 104. Or, the strength or phase of the reflection electromagnetic field received by the RFID reader 103 significantly changes with a change in the resonant frequency of the tag, or the like. That is, when the target article 105 is present on the target article placement region 110, the RFID reader 103 cannot read the tag information, or the strength or phase of the reflection electromagnetic field received from the RF tag 104 significantly changes compared to when the target article 105 is absent. Thus, the RFID reader 103 can detect that the target article 105 is present. In other words, when a change in the presence or absence of the target article 105 changes the operation characteristics of the tag antenna 112, the RFID reader 103 can detect a change in the strength or phase of the reflection signal from the RF tag 104 and thus can detect the change in the presence or absence of the target article.

As seen above, by using the detection unit of the commodity promotion system 1 according to the first exemplary embodiment, detection on whether one target article 105 is present or absent no longer needs blocking of the line-of-sight between the corresponding RF tag 104 and the RFID reader 103 by the target article 105. It is only necessary to define a region for placing the target article 105 away from the tag antenna 112 (or RF tag 104) so that the target article 105 is electromagnetic-field-coupled with the tag antenna 112. Thus, the positions of articles to be managed are no longer limited to between the RFID reader 103 and corresponding RF tags 104, allowing the articles to be placed freely.

Further, the detection unit of the commodity promotion system 1 according to the first exemplary embodiment does not simply determine that an article has been placed near the reader antenna 102 being fed, based on a change in the operation characteristics of that antenna but rather determines that the operation characteristics of the tag antenna 112 have changed, based on a change in the tag information read signal received by the RFID reader 103. As seen above, by disposing the RF tags 104 between the target articles 105 and the reader antenna 102, it is possible to increase the freedom degree of the relative positions between the reader antenna 102 and the regions for placing the target articles 105. Further, an electromagnetic field generated by each tag antenna 112 in the region having a corresponding target article 105 placed thereon includes a radiated electromagnetic field component, as well as quasi-static and induced electromagnetic-field components. Accordingly, the electromagnetic-field components spread in various directions, compared to the radiated electromagnetic field component in a typical far field. Thus, the commodity promotion system 1 according to the first exemplary embodiment can increase the freedom degree of the relative positions between the articles to be managed and the tags.

Further, the detection unit of the commodity promotion system 1 according to the first exemplary embodiment is based on an RFID system and therefore each RF tag 104 has unique tag information. Thus, multiple access is possible on the basis of the tag information. Even when multiple target articles 105 are targeted, if the tag information of each RF tag 104, a corresponding target article 105, and the output unit 400 for outputting information related to the target article 105 are associated with one another, it is possible to transmit information related to a picked-up target article 105 to the associated output unit 400, since the RF tags 104 associated with the target articles 105 have different pieces of tag information. When one target article 105 is present, the RFID reader 103 cannot read the tag information of an RF tag 104 corresponding to the target article 105 and thus can determine that the target article 105 is present. In contrast, when one target article 105 is absent, an RF tag 104 corresponding to the target article 105 responds to a signal from the RFID reader 103, and the RFID reader 103 can read the tag information of the RF tag 104. Accordingly, if the target article 105 is absent, the RFID reader 103 can read the tag information of an RF tag 104 corresponding to the target article 105 with the normal strength of a reflection electromagnetic field and thus can detect that the target article 105 is absent. Thus, the RFID reader 103 can detect the presence or absence of each target article 105 and can detect that one target article 105 has changed from a present state to an absence state, that is, a commodity has been picked up. As seen above, the detection unit of the commodity promotion system 1 according to the first exemplary embodiment can detect that any target article 105 has been picked up, without attaching RF tags 104 to articles to be managed.

In the detection unit of the commodity promotion system 1 according to the first exemplary embodiment, it is only necessary to defining the regions for placing the target articles 105 away from the corresponding RF tags 104 so that the target articles 105 are electromagnetic-field-coupled with the tag antennas 112 of the RF tags 104. Accordingly, the RF tags 104 are not attached to the target articles 105, and the RF tags 104 can be used repeatedly. Thus, the per-article tag cost is substantially a value obtained by dividing the tag cost by the number of time the tag is used. As a matter of course, the problem that an RF tag 104 is costly can be solved by using the RF tag 104 a sufficient number of times.

Further, the RF tags 104 are not attached to the target articles 105 in the detection unit of the commodity promotion system 1 according to the first exemplary embodiment and therefore illegal reading of an RF tag 104 attached to any target article 105 is prevented, so that privacy violation or information security problem is prevented. That is, the commodity promotion system 1 according to the first exemplary embodiment does not cause the problem that tag information is illegally read by a third party.

Further, in the detection unit of the commodity promotion system 1 according to the first exemplary embodiment, the target article placement regions 110 for placing the target articles 105 are defined so that the first distance L1 between each target article 105 and a corresponding tag antennas 112 satisfies the relationship L1≤λ where λ represents the wavelength of a signal used by the RFID reader 103 and an RF tag 104 for communication. Further, in the detection unit of the commodity promotion system 1 according to the first exemplary embodiment, the line-of-sight distance, the second distance L2, between the strip conductor 102*a* of the reader antenna 102 of the RFID reader 103 and the tag antenna 112 of each RF tag 104 satisfies the relationship L2≤λ. Note that in the detection unit of the commodity promotion system 1 according to the first exemplary embodiment, the distance refers to a distance in terms of radio propagation and approximately corresponds to the shortest geometrical distance.

If the distance L1 between each target article placement region 110 having a corresponding target article 105 placed thereon and the tag antenna 112 of a corresponding RF tag 104 satisfies the relationship L1≤λ, the regions having the articles placed thereon fall within the range of the near field when seen from the RF tags 104. Accordingly, if quasi-static and induced electromagnetic fields make sufficient contributions, if the target articles 105 each include a high-permittivity material such as water, or a metal, and if the target articles 105 are placed on the corresponding target article placement regions 110, the target articles 105 and corresponding tag antennas 112 can be electromagnetic-field-coupled through the quasi-static and induced electromagnetic fields. Note that a human body can also be detected as a target article 105, since the human body contains a large amount of water. Accordingly, this system can be also used to manage the traffic line of humans.

By setting the first distance L1 so that L3<λ, the tag antennas 112 and corresponding target articles 105 are electromagnetic-field-coupled through quasi-static and induced electromagnetic field components with non-negligible strengths existing in the near fields of the tag antennas 112, in accordance with mutual inductance, capacitance, or the like. Accordingly, a change in the presence or absence of one target article 105 changes the circuit constant of a corresponding tag antenna 112, thereby changing the operation characteristics of the tag antenna 112. The change in the presence or absence of the target article 105 also causes a change in the resonant frequency of the tag antenna 112, which is a more identifiable change. If commonly available RF tags are used as the RF tags 104 in order to reduce the system cost, standing-wave antennas, typified by dipole antennas, are used as the tag antennas 112. In this case, by setting the resonant frequency of the tag antennas 112 to a frequency according to the radio communication frequency, the sensitivity of the RF tags 104 is improved. As seen above, a state in which one tag antenna 112 is resonating at the set resonant frequency corresponds to a state in which a corresponding target article 105 is absent.

Subsequently, when the target article 105 is placed on the RF tag 104, the tag antenna 112 typically reduces its resonant frequency to couple with the target article 105. Accordingly, the sensitivity of the tag antenna 112 at the radio communication frequency significantly decreases. For example, if the operating power of the RFID chip 111 is not provided due to such a decrease in reception sensitivity, the RF tag 104 does not respond to an inquiry from the RFID reader 103. Even if the operating power is provided, the tag antenna 112 cannot make a change to the spatial electromagnetic field with sufficient strength using a modulation signal generated by the RFID chip 111.

As a result, when the target article 105 is present, the RF tag 104 no longer responds to an inquiry from the RFID reader 103, or the strength of the reflection electromagnetic field from the RF tag 104 significantly changes compared to when the target article 105 is absent. The RFID reader 103 then detects the change in the strength of the reflection electromagnetic field and thus can determine that the target article 105 is absent. This determination process may be performed, for example, by a computer. As seen above, the commodity promotion system 1 according to the first exemplary embodiment can detect and manage the presence or absence of the target articles 105 without attaching the RF tags 104 to the target articles 105.

Further, in the commodity promotion system 1 according to the first exemplary embodiment, obtaining a change in the response of the RF tag 104 based on the presence or absence of one target article 105 only requires setting the first distance L1 between each RF tag 104 and a corresponding target article 105 so that the first distance L1 satisfies the relationship L1≤λ. Accordingly, the target article 105 does not need to block the line-of-sight of the RF tag 104 and reader antenna 102. That is, the positions of the target articles 105 are not limited to between the reader antenna 112 of the RFID reader 103 and the corresponding RF tags 104, thereby improving the freedom degree of the positions. For example, by incorporating a reader antenna 102 and RF tags 104 into the shelves of a showcase, it is possible to detect the presence or absence of target articles on the showcase. In this case, the antennas are hidden and therefore the appearance is significantly improved.

While the method of detecting a change in the signal strength on the basis of the deviation of the resonant frequency of any tag antenna 112 from the radio communication frequency has been mainly described, the present invention is not limited thereto. For example, when the resonant frequency deviates, the reader may detect the presence or absence of an article by sweeping the radio communication frequency to the extent permitted by law and detecting the deviation of the resonant frequency. Further, the phase significantly shifts between before and after the resonant frequency. Accordingly, the presence or absence of any article may be detected by observing the phase shift, as a matter of course.

Further, as with the first distance L1, each tag antenna 112 and the reader antenna 102 falls within the near field as long as the line-of-sight distance L2 between the tag antenna 112 and the strip conductor 102*a* of the reader antenna 102 satisfies the relationship L2≤λ. As used herein, the line-of-sight distance L2 refers to the distance between the strip conductor, which acts as a particularly strong wave source in the reader antenna 102, and each tag antenna 112. By setting the line-of-sight distance L2 to λ or less, the reader antenna 102 and each antenna 112 can be electromagnetic-field-coupled in the near field where the quasi-static and induced electromagnetic fields make sufficient contributions. On the other hand, in the commodity promotion system 1 according to the first exemplary embodiment, the presence or absence of any article is determined based on the strength of a reflection electromagnetic field from a corresponding RF tag 104, that is, based on an analog quantity. Accordingly, radio-frequency interference is more likely to change the strength of the reflection electromagnetic field, resulting in false detection. However, owing to the configuration described above, direct waves are predominant in radio communication between the reader antenna 102 and each tag antenna 112 in the commodity promotion system 1 according to the first exemplary embodiment. Accordingly, radio-frequency interference associated with a multipath phenomenon is less likely to occur. Thus, false detection can be reduced. Further, an electromagnetic field generated by the antenna of the RFID reader 103 and the antenna of each RF tag 104 includes a radiated electromagnetic field component, as well as quasi-static and induced electromagnetic field components. Accordingly, the electromagnetic field components spread in various directions compared to in a typical far field, where only a radiated electromagnetic field component is present. Thus, in the commodity promotion system 1 according to the first exemplary embodiment, it is possible to increase the freedom degree of the relative positions of the reader antenna 102 and each RF tag 104.

In the commodity promotion system 1 according to the first exemplary embodiment, the presence or absence of the articles is determined based on analog amounts, including the strength of a reflection electromagnetic field from each RF tag 104, a phase shift, and a change in the resonant frequency of each tag antenna 112. Accordingly, radio-frequency interference associated with the ambient environment may cause false detection. However, in the commodity promotion system 1 according to the first exemplary embodiment, the relationship L2≤λ is satisfied and thus direct waves become predominant in radio communication between the reader antenna 102 and each tag antenna 112. Accordingly, radio-frequency interference associated with a multipath phenomenon which reflects the ambient environment is less likely to occur. Thus, false detection can be reduced. Even if the presence or absence of target articles on a metal shelf or metal refrigeration showcase is managed, this system can operate stably.

Since the relationship L2≤λ, is satisfied in the commodity promotion system 1 according to the first exemplary embodiment, the line-of-sight distance L2 between the strip conductor 102*a* of the reader antenna 102 and each RF tag 104 is about 0.3 m or less for the UHF band, which is one of the RFID standard frequency bands, and about 0.12 m or less for the 2.4 GHz band. Further, since the distance L1 between each target article placement region 110 and a corresponding RF tag 104 satisfies the relationship L1<λ, the distance L1 is about 0.3 m or less for the UHF band and about 0.12 m or less for 2.4 GHz band. Accordingly, the distance between the reader antenna 102 and each target article placement region 110 is also on this order and is narrow. That is, by using the commodity promotion system 1 according to the first exemplary embodiment, the distance between each target article 105 and a corresponding RF tag 104 or the reader antenna 102 is narrowed. Thus, entry of a human or object, which differs from a target article 105, can be reduced, thereby reducing false detection.

In the commodity promotion system 1 according to the first exemplary embodiment, the first distance L1 preferably satisfies the relationship L1≤λ/2π where π represents the circular constant. If each target article 105 has an effect on the frequency characteristics of a corresponding tag antenna 112, when each target article 105 and a corresponding tag antenna 112 are disposed in a reactive near field where the first distance L1 satisfies the relationship L1≤λ/2π, the strength of an electromagnetic field generated by the tag antenna 112 is increased compared to in the radiative near field where L1>λ/2π. The contributions of the quasi-static and induced electromagnetic fields remaining near the antenna become larger, whereas the contribution of the radiated electromagnetic field becomes smaller. Accordingly, in the commodity promotion system 1 according to the first exemplary embodiment, the target articles 105 and tag antennas 112 are coupled more strongly. As a result, a change in the presence or absence of one target article 105 significantly changes the operation characteristics of a corresponding tag antenna 112. Accordingly, in the commodity promotion system 1 according to the first exemplary embodiment, the strength of a reflection electromagnetic field transmitted to the RFID reader 103 by the RF tag 104 significantly changes. Thus, it is possible to reduce false detection as a commodity promotion system which is resistant to disturbance or noise.

In the commodity promotion system 1 according to the first exemplary embodiment, the line-of-sight distance L2 preferably satisfies the relationship L2≤λ/2π. When the line-of-sight distance L2 satisfies the relationship L2≤λ/2π in the commodity promotion system 1 according to the first exemplary embodiment, the contributions of the quasi-static and induced electromagnetic fields remaining near the antenna are increased and the reader antenna 102 and each tag antenna 112 are coupled more strongly, compared to when the line-of-sight distance L2 is L2>λ/2π. Thus, in the commodity promotion system 1 according to the first exemplary embodiment, the communication between the RFID reader 103 and each RF tag 104 is insusceptible to disturbance or noise. As a result, the commodity promotion system 1 according to the first exemplary embodiment can realize a commodity promotion system that is insusceptible to disturbance or noise. Further, since quasi-static, induced, and radiated electromagnetic field components with sufficient strengths respectively are present and the vector direction changes temporally in various manners in the commodity promotion system 1 according to the first exemplary embodiment, it is possible to increase the freedom degree of the relative orientations of the reader antenna 102 and each tag antenna 112.

When the relationship $L2 \leq \lambda/2\pi$ is satisfied in the commodity promotion system 1 according to the first exemplary embodiment, the line-of-sight distance between the strip conductor 102*a* of the reader antenna 102 and each RF tag 104 is about 0.05 m or less for the UHF band, which is one of the RFID standard frequency bands, and about 0.02 m or less for 2.4 GHz band. Thus, according to the commodity promotion system 1 according to the first exemplary embodiment, there can be realized a commodity promotion system that does not have to ensure wide space between the reader antenna 102 and each RF tag 104. For example, it is possible to house a reader antenna 102, RF tags 104, and articles to be managed in a showcase. Further, owing to the shortened distance, it is possible to reduce entry of a human or object into therebetween and to reduce false detection associated with blocking of the line-of-sight.

In a well-known traditional system, where RF tags are attached to target articles on a showcase to manage the articles, the RF tag attachment position varies among target articles. In this case, satisfying the relationship $L2 < \lambda/2\pi$ undesirably limits the types of target articles or the RF tag attachment position. For this reason, such a system must use a radiated electromagnetic field-using antenna, which is capable of communication up to the far field, so that the reader antenna and each RF tag which are mutually somewhat distant can communicate with each other. Accordingly, an open transmission line, which basically aims to transmit electromagnetic waves in the length direction of the line while controlling radiation, is not suitable for the above traditional system, and a resonant antenna or leaky coaxial cable is typically used. However, these antennas generate radiated electromagnetic fields efficiently, and the strength of the radiated electromagnetic fields is attenuated with respect to the distance only at 1/r. Accordingly, if such an antenna is used as the reader antenna, the reading area would expand. Thus, such a reader antenna would cause problems in terms of commodity management, including one that it would read RF tags attached to target articles on an adjacent shelf.

On the other hand, in the commodity promotion system 1 according to the first exemplary embodiment, no RF tags 104 are attached to target articles. Accordingly, for example, it is easy to install a reader antenna 102 on the bottom of a showcase, then to dispose RF tags 104 on the reader antenna 102 with an adjusted coupling coefficient in such a manner that the relationship $L2 \leq \lambda/2\pi$ is satisfied, and then to dispose corresponding articles to be managed on the RF tags 104. Accordingly, the commodity promotion system 1 according to the first exemplary embodiment can use an open transmission line, which basically aims to transmit electromagnetic waves in the length direction of the line while controlling radiation. As seen above, by using the reader antenna 102 which controls radiation whose strength is attenuated only at 1/r and uses, as principal electromagnetic-field components, a quasi-static electromagnetic field, which is attenuated at $1/r^3$, and an induced electromagnetic field, which is attenuated at $1/r^2$, it is easy to read the RF tags 104 using the single reader antenna 102 and to limit the commodity management region so as to manage the presence or absence of the target articles on the showcase. Further, a problem that the reader antenna 102 would read an RF tag 104 on an adjacent another shelf is less likely to occur. While the example in which commodities on a showcase are managed has been described, the commodity promotion system 1 according to the first exemplary embodiment is also applicable to cases where articles on another shelf or articles on the floor are managed. In these cases also, it is, of course, easy to limit the region where RF tags 104 are read by a single reader antenna 102 to limit the region where commodities are managed.

In the commodity promotion system 1 according to the first exemplary embodiment, the first distance L1 and second distance L2 preferably satisfy the relationship L2>L1. While the strength of electromagnetic-field coupling changes according to the structure of the antennas or resonator or the properties of the medium between the antennas, it also significantly depends on the distance. By setting the first distance L1 and second distance L2 so that L2>L1 in the commodity promotion system 1 according to the first exemplary embodiment, the coupling coefficient k2 between each target article placement region 110 having a corresponding target article 105 placed thereon and a corresponding tag antenna 112 can be made larger than the coupling coefficient k1 between the reader antenna 102 and the tag antenna 112. That is, by ensuring the relationship L2>L1, a change in reflection-wave strength caused by a change in the frequency characteristics of a tag antenna 112 based on a change in the presence or absence of a corresponding article becomes larger than the maintenance of communication between the tag antenna 112 and the reader antenna 102. Thus, the commodity promotion system 1 according to the first exemplary embodiment can reliably identify the presence or absence of the target articles 105 and thus can reduce false detection.

In the commodity promotion system 1 according to the first exemplary embodiment, the coupling coefficient k1 between the reader antenna 102 and each tag antenna 112 is preferably set to a value of $10^{-5}$ or more. The reception sensitivity which provides the operation limit of current UHF-band RF tags is approximately −20 dBm. On the other hand, the output of a high-output UHF-band RFID reader is 30 dBm. Accordingly, if the coupling coefficient k1 is a value of $10^{-5}$ or more, power for operating a UHF-band RF tag can be supplied.

In the commodity promotion system 1 according to the first exemplary embodiment, the coupling coefficient k1 between the reader antenna 102 and each tag antenna 112 is preferably set to a value of $10^{-2}$ or less. If a tag antenna 112 is regarded as a dipole resonator, electromagnetic-field coupling between the reader antenna 102 (e.g., open transmission line) and the tag antenna 112 can be interpreted as coupling between an open transmission line and a resonator in terms of a circuit. Accordingly, too large a coupling coefficient largely affects the operation of the open transmission line, thereby affecting the operation of other RF tags 104 forming a coupled resonator system. The situation in which the multiple resonators are coupled in parallel to the open transmission line is considered as a band-elimination filter circuit. If copper or aluminum is used at room temperature as the tag antenna of a UHF-band RF tag, the unloaded Q-value is approximately 100 or less. Accordingly, when the coupling coefficient k1, which determines the fractional bandwidth, is a value of $10^{-2}$ or less, the operation of the open transmission line is hardly affected. Accordingly, by setting the coupling coefficient k1 to a value of $10^{-2}$ or less, it is possible to reduce the effect of the coupling among the tag antennas 112 on the open transmission line, as well as to reduce the effects that the open transmission line and the RFID reader 103 coupled in parallel thereto have on each other.

In the commodity promotion system 1 according to the first exemplary embodiment, the coupling coefficient k1 between the reader antenna 102 and a tag antenna 112 and, when a target article 105 is placed on a corresponding target article placement region 110, the coupling coefficient k2 between the target article 105 and a corresponding tag antenna 112 preferably satisfy the relationship k1<k2. According to the present invention, by setting k1<k2, that is, by making the coupling coefficient k2 between the target article placement region 110 and tag antenna 112 larger than the coupling coefficient k1 between the reader antenna 102 and tag antenna 112, a change in reflection-signal strength caused by a change in the frequency characteristics of the tag antenna 112 based on a change in the presence or absence of an article becomes larger than the maintenance of communication between the reader antenna 102 and tag antenna 112. Thus, the commodity promotion system 1 according to the first exemplary embodiment can reliably identify the presence or absence of the target articles 105 and thus can reduce false detection.

While the positional relationships among the reader antenna 102, RF tag 104 and target article 105 have been described specifically in the first exemplary embodiment, the relative positions or orientations of these elements are not limited to the specific example shown in FIG. 5.

Second Exemplary Embodiment

Figure 9:
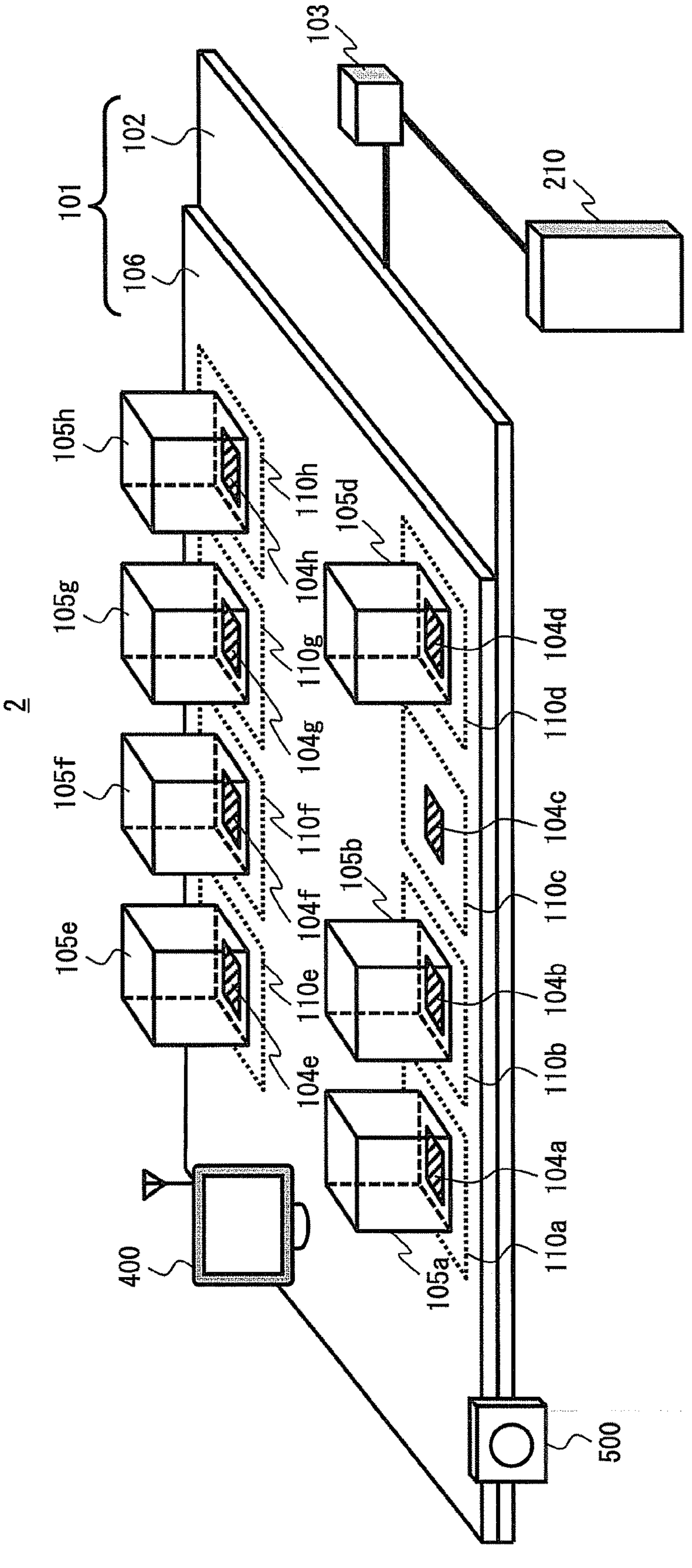
FIG. 9 is a schematic view of a commodity promotion system according to a second exemplary embodiment.

In a second exemplary embodiment, there will be described an exemplary embodiment in which the commodity promotion system according to the first exemplary embodiment performs promotion considering attributes of customers (age, sex, body shape, preferences, health conditions, or the like). FIG. 9 shows a schematic view of a commodity promotion system 2 according to the second exemplary embodiment. The same elements as those in the first exemplary embodiment will not be described.

As shown in FIG. 9, in the commodity promotion system 2 according to the second exemplary embodiment, an additional information input unit 500 for acquiring the original data from which attributes of customers are extracted is disposed adjacent to a detection unit 300. The additional information input unit 500 can communicate with a customer behavior analysis apparatus 210. The additional information input unit 500 acquires data used to estimate attributes of a customer which has picked up a target article 105. While the additional information input unit 500 is disposed on a side of a showcase 101 in FIG. 9, it may be disposed in other positions. The additional information input unit 500 may be disposed in any position as long as the position is a position which is adjacent to the associated commodities and in which it can acquire image data from which attributes of a customer which has picked up a commodity can be extracted.

Figure 10:
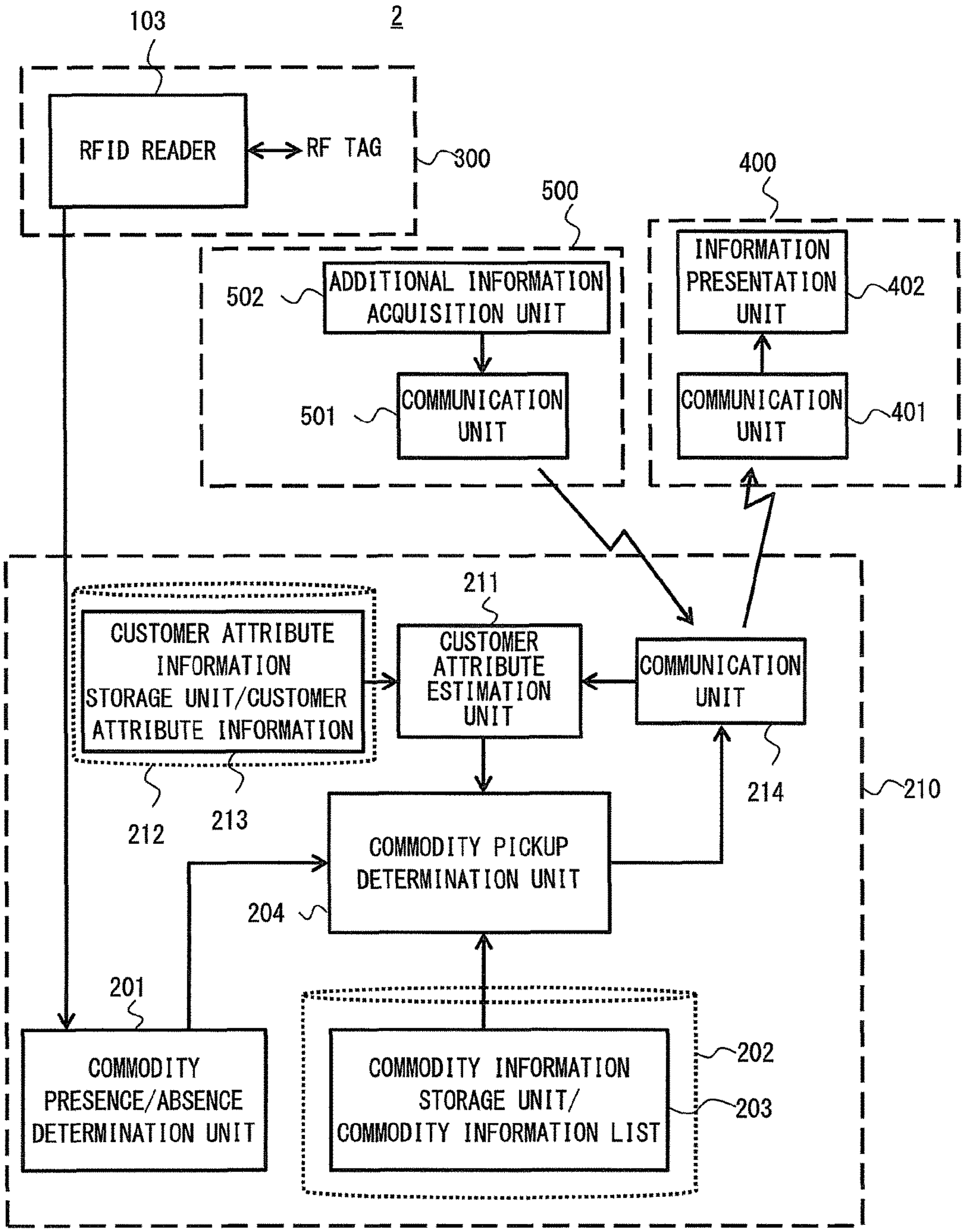
FIG. 10 is a block diagram of the commodity promotion system according to the second exemplary embodiment.

FIG. 10 shows a block diagram of the commodity promotion system 2 according to the second exemplary embodiment. As shown in FIG. 10, the commodity promotion system 2 according to the second exemplary embodiment is formed by adding the additional information input unit 500 to the commodity promotion system 1 according to the first exemplary embodiment. In the commodity promotion system 2 according to the second exemplary embodiment, the customer behavior analysis apparatus 220 according to the first exemplary embodiment is replaced with a customer behavior analysis apparatus 210.

The customer behavior analysis apparatus 210 is formed by adding a customer attribute estimation unit 211 and a storage unit 212 to the customer behavior analysis apparatus 200 according to the first exemplary embodiment and replacing the communication unit 205 with a communication unit 214.

The storage unit 212 includes a customer attribute information storage unit 213. The customer attribute information storage unit 213 stores customer attribute information serving as a customer attribute database. The customer attribute estimation unit 211 estimates attributes of a customer using the database and data acquired using the additional information input unit 500. In the second exemplary embodiment, a commodity pickup determination unit 204 selects, from a commodity information list, output information corresponding to the customer attributes estimated by the customer attribute estimation unit 211 and then outputs the output information.

The communication unit 214 transmits the output information to a communication unit 401 of an output unit 400, as with the communication unit 205 according to the first exemplary embodiment, as well as receives data acquired by an additional information acquisition unit 502 of the additional information input unit 500 from a communication unit 501 thereof and provides the data to the customer attribute estimation unit 211.

The additional information input unit 500 includes the communication unit 501 and additional information acquisition unit 502. The communication unit 501 is a communication interface for communicating with the communication unit 214. The additional information acquisition unit 502 acquires data used to estimate attributes of a customer which has picked up a target article. The additional information input unit 500 is, for example, a camera.

In the commodity promotion system 2 according to the second exemplary embodiment, the tag information of each RF tag 104 is associated with various types of information in the commodity information list. FIG. 12 shows an example of the commodity information list used in the commodity promotion system 2 according to the second exemplary embodiment. As shown in FIG. 12, the commodity information list according to the second exemplary embodiment is formed by adding camera ID information as the ID information of the additional information input unit 500 to the commodity information list of the first exemplary embodiment. Further, in the commodity information list of the second exemplary embodiment, output information is classified into that for males and that for females, and the output information for each sex is classified into age-specific output information. Note that FIG. 12 is only illustrative, and output information classified only by age or only by sex may be set. As will be described later, commodity presence/absence information may be rewritten by the commodity pickup determination unit 204 during operation.

Figure 11:
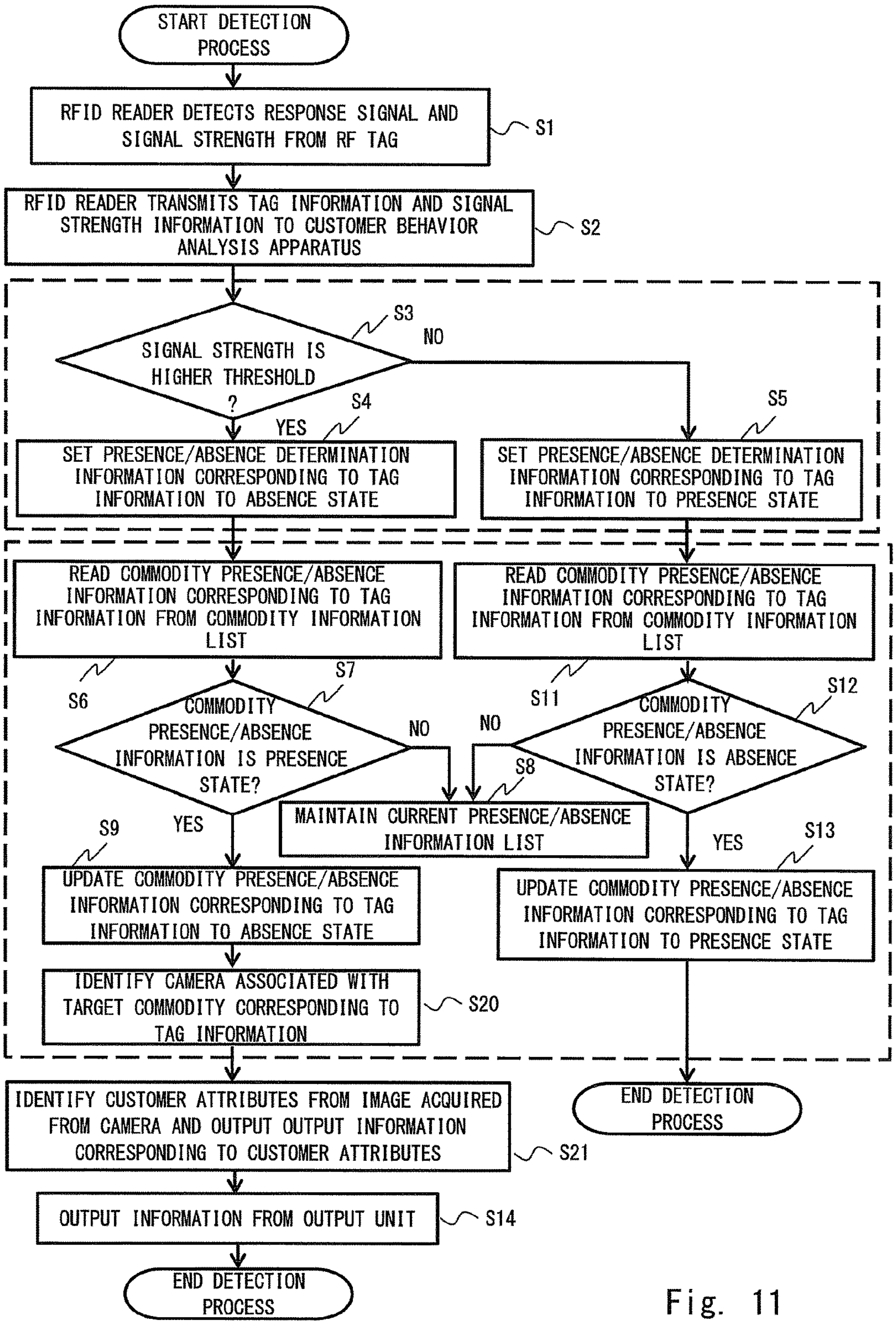
FIG. 11 is a flowchart showing an operation of the commodity promotion system according to the second exemplary embodiment.

FIG. 11 shows a flowchart showing an operation of the commodity promotion system 2 according to the second exemplary embodiment. As shown in FIG. 11, the commodity promotion system 2 according to the second exemplary embodiment also performs a target article 105 presence/absence determination process in steps S1 to S9 and S11 to S13. After determining in step S9 that a customer has picked up a target article 105, the commodity promotion system 2 according to the second exemplary embodiment identifies, in the commodity information list, an additional information input unit 500 (e.g., camera) associated with the tag information of an RF tag 104 corresponding to the picked-up target article 105 (step S20).

Then, the identified camera, that is, the additional information input unit 500 acquires the image data of the customer who has picked up the commodity and transmits the image data to the communication unit 214 of the customer behavior analysis apparatus 210 through the communication unit 501 wirelessly (or by wire). The customer attribute estimation unit 211 acquires the image data from the communication unit 214, extracts the feature value of the face of the customer from the image data, compares the feature value with the customer attribute information stored in the customer attribute information storage unit 213, and estimates attributes (age, sex, or the like) of the customer (step S21).

After estimating the attributes (age, sex, or the like) of the customer, the commodity pickup determination unit 204 of the customer behavior analysis apparatus 210 retrieves the commodity information list from the commodity information storage unit 203 and outputs output information which is associated with the target article 105 (the tag information of the RF tag 104) and corresponds to the attributes (age, sex, or the like) of the customer (step S21). The customer behavior analysis apparatus 210 then transmits this output information to the communication unit 401 of the output unit 400 through the communication unit 214 wirelessly (or by wire). The output unit 400 receives the output information at the communication unit 401 and outputs information associated with the picked-up commodity from an information presentation unit 402 (step S22).

Note that while the output information is set considering both age and sex as attributes of customers in the commodity information list of FIG. 12, only age or only sex may be considered.

Examples of the method for estimating age and sex from image data of a customer include "Correspondence driven adaptation for human profile recognition," Ming Yang and three others, Computer Vision and Pattern Recognition (CVPR), 2011 IEEE Conference on June, 2011, p. 505-512 (hereafter referred to as "Ming et al."). Specifically, learned data in which the feature value of each human face is associated with age and sex is previously generated and stored in the customer attribute information storage unit 213 as a database. Subsequently, a face is extracted from an image captured by a camera, and the feature value of the extracted face is calculated. Then, the customer attribute estimation unit 211 compares the calculated feature value with the feature values in the database and calculates the estimated values of age and sex. The customer attribute estimation unit 211 then estimates age and sex having the highest estimated values as the age and sex of the customer in the image captured by the camera. Note that the method for estimating the age and sex of a customer is not limited to the method described in Ming et al. Nevertheless, it is preferred to use a method of estimating age and sex using an algorithm which is configured to be executed in an small arithmetic unit, such as that described in Ming et al.

If the additional information input unit 500 is a camera, the body shape of the customer can also be investigated. Thus, it is possible to recommend a commodity suitable for the body shape. For example, if the customer has a fat body shape, low-calorie food or the like may be recommended. Further, other attributes of a customer, such as preferences, may be acquired, for example, by using an odor sensor as the additional information input unit 500. There is a study that customers whose have smelled a certain aroma take different purchase actions due to the properties of the aroma. A recommended commodity may be changed by detecting an aroma emitted from the customer.

As seen above, by using the commodity promotion system 2 according to the second exemplary embodiment, information which is related to the commodity picked up by the customer, as well as is suitable for the attributes of the customer is presented to the customer. Thus, the possibility that the customer may purchase the recommended commodity is further increased, and there can be provided a promotion system which provides high customer satisfaction. In this case, no tags are attached to commodities and therefore security related to commodity purchase can be improved.

Third Exemplary Embodiment

Figure 13:
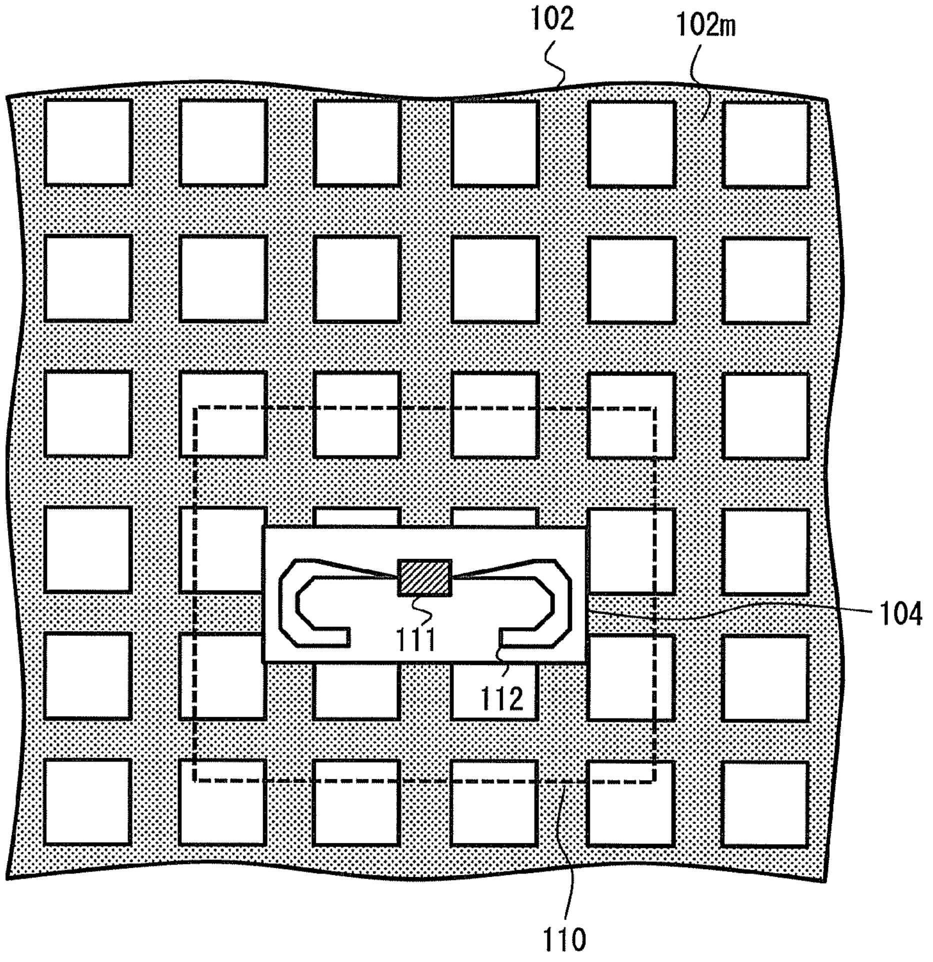
FIG. 13 is a top view of the commodity promotion system according to a third exemplary embodiment, which shows a placement of a target article and the positional relationship between a RF tag and a reader antenna in the commodity promotion system.
Figure 14:
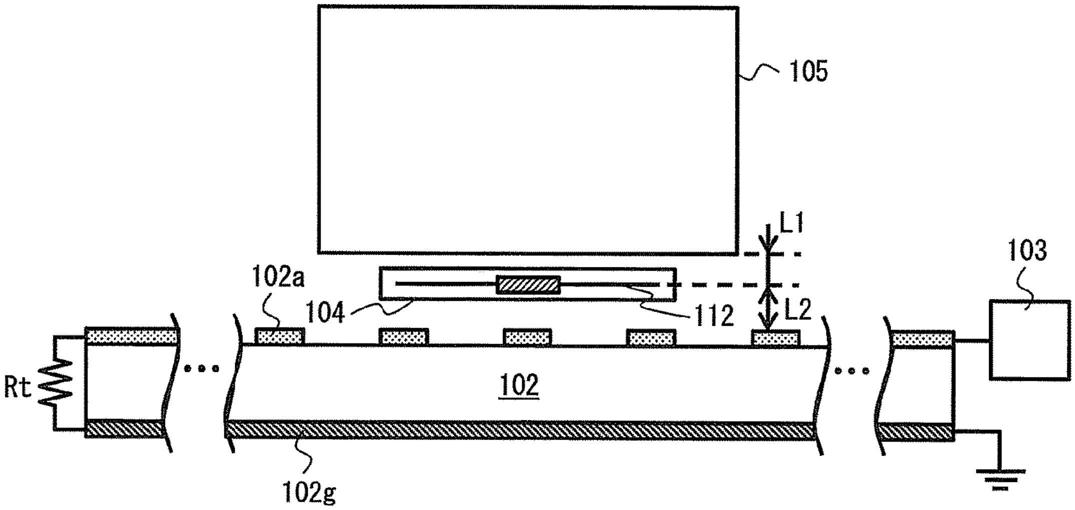
FIG. 14 is a front sectional view of the commodity promotion system according to the third exemplary embodiment, which shows a placement of a target article and the positional relationship between a RF tag and a reader antenna in the commodity promotion system.
Figure 15:
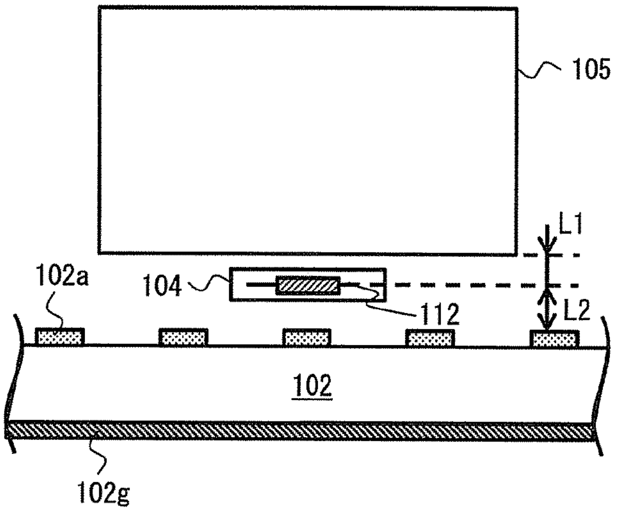
FIG. 15 is a side sectional view of the commodity promotion system according to the third exemplary embodiment, which shows a placement of a target article and the positional relationship between a RF tag and a reader antenna in the commodity promotion system.

In a third Exemplary Embodiment, there will be described an exemplary embodiment in which an antenna expanding in a plane shape is used as a reader antenna 102. FIG. 13 shows a top view of a detection unit of a commodity promotion system according to the third exemplary embodiment; FIG. 14 shows a front sectional view of the detection unit of the commodity promotion system according to the third exemplary embodiment; and FIG. 15 shows a side sectional view of the commodity promotion system according to the third exemplary embodiment. A RFID reader is not shown in these drawings. In the third exemplary embodiment, the same elements as those in the first exemplary embodiment are given the same reference signs and will not be described.

In the detection unit of the commodity promotion system according to the third exemplary embodiment, a reader antenna 102 is configured to transmit a signal by changing an electromagnetic field in a region sandwiched between a mesh conductor and a sheet conductor and in an outer seepage region adjacent to the mesh conductor. As shown in FIG. 13, in the detection unit of the commodity promotion system according to the third exemplary embodiment, a mesh conductor 102*m* is disposed on the front surface of the reader antenna 102. Further, in the detection unit of the commodity promotion system according to the third exemplary embodiment, a ground conductor 102*g* is disposed on the back surface of the reader antenna 102. A cover for mainly improving durability may be disposed over a strip conductor 102*a* or under the ground conductor 102*g*. The material of the cover disposed over the strip conductor 102*a* is a material that leaks an electromagnetic field.

As shown in FIGS. 14 and 15, in the detection unit of the commodity promotion system according to the third exemplary embodiment, the mesh conductor is disposed in the form of strip conductors 102*a* which are spaced from each other in plan and side views. As is apparent in FIGS. 14 and 15, in the third exemplary embodiment, the strip conductors 102*a* are disposed in a mesh form on the front surface of the reader antenna 102. Also, as is apparent in FIGS. 14 and 15, in the third exemplary embodiment, the ground conductor 102*g* is disposed in a sheet form on the back surface of the reader antenna 102.

In the detection unit of the commodity promotion system according to the third exemplary embodiment, the reader antenna 102 generates a standing wave therein due to a problem associated with end treatment and also includes a traveling wave component although imperfect. The reader antenna 102 can be used if unevenness in the electromagnetic-field distribution caused by this standing wave is negligible.

Fourth Exemplary Embodiment

Figure 16:
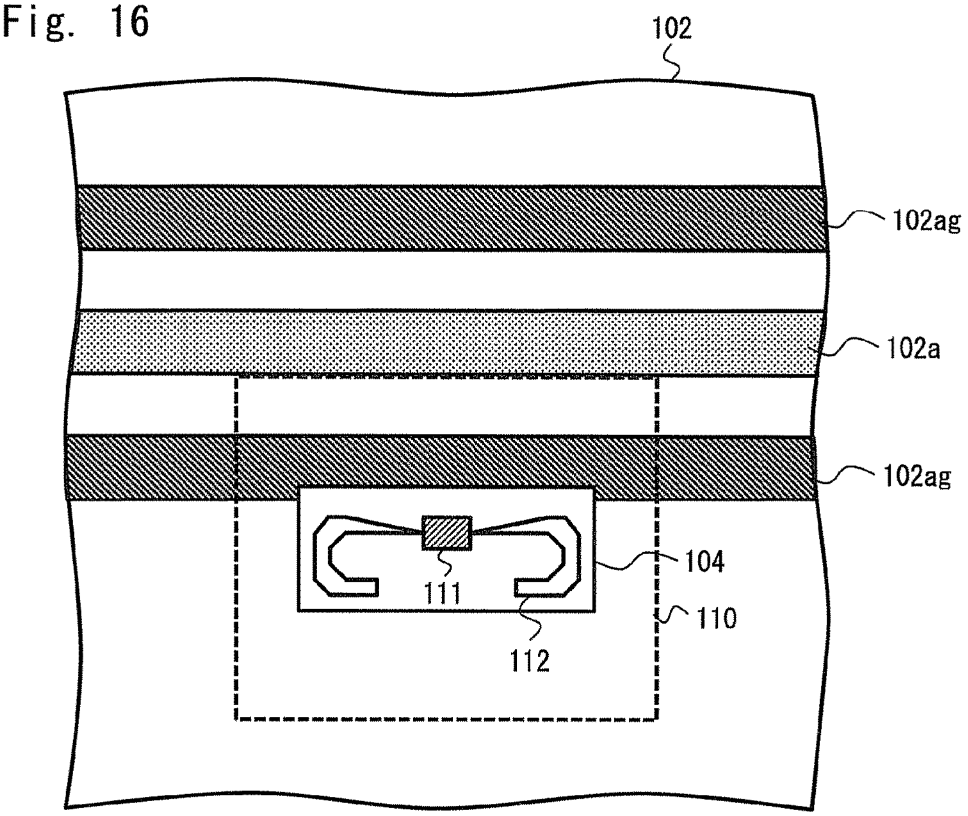
FIG. 16 is a top view of the commodity promotion system according to a fourth exemplary embodiment, which shows a placement of a target article and the positional relationship between a RF tag and a reader antenna in the commodity promotion system.
Figure 17:
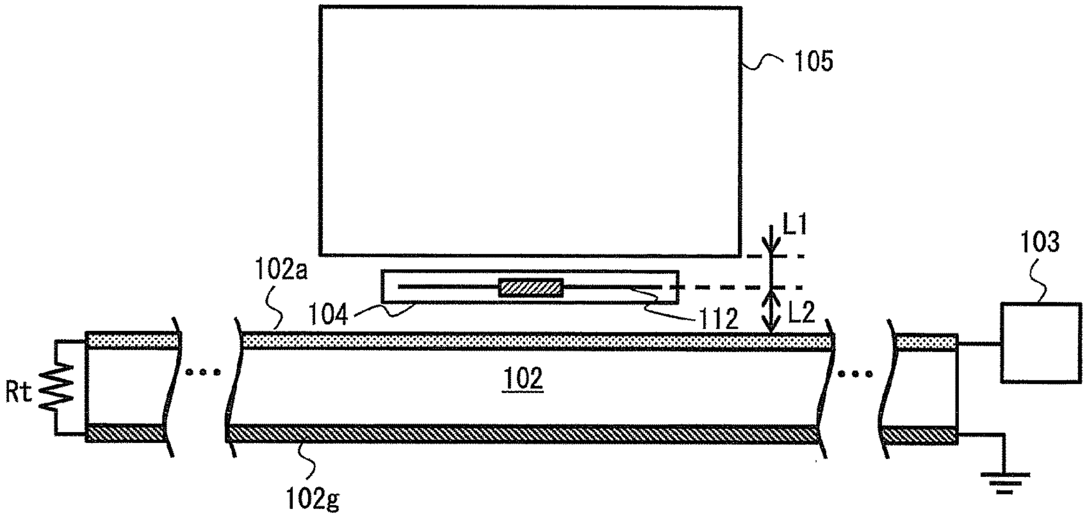
FIG. 17 is a front sectional view of the commodity promotion system according to the fourth exemplary embodiment, which shows a placement of a target article and the positional relationship between a RF tag and a reader antenna in the commodity promotion system.
Figure 18:
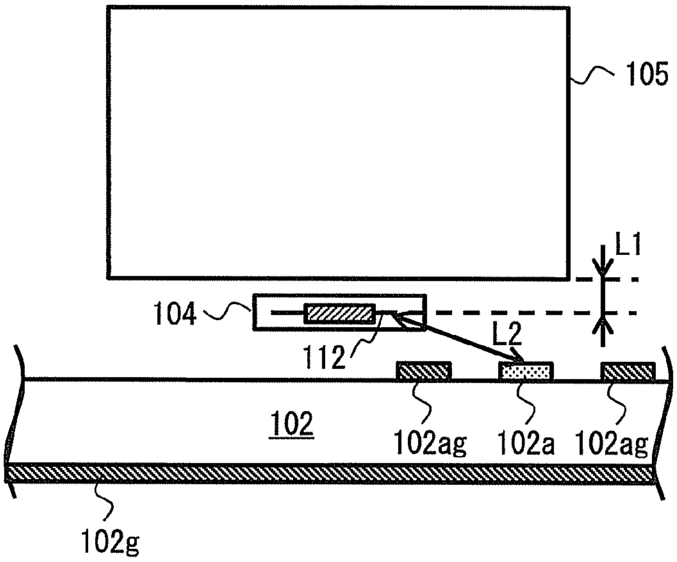
FIG. 18 is a side sectional view of the commodity promotion system according to the fourth exemplary embodiment, which shows a placement of a target article and the positional relationship between a RF tag and a reader antenna in the commodity promotion system.

In a fourth exemplary embodiment, there will be described an exemplary embodiment in which a grounded coplanar line is used as a reader antenna 102 in the detection unit of a commodity promotion system. This grounded coplanar line serves as an open transmission line and as a travelling-wave antenna. FIG. 16 shows a top view of the detection unit of a commodity promotion system according to the fourth exemplary embodiment; FIG. 17 shows a front sectional view of the detection unit of the commodity promotion system according to the fourth exemplary embodiment; and FIG. 18 shows a side sectional view of the detection unit of the commodity promotion system according to the fourth exemplary embodiment. A RFID reader is not shown in these drawings. In the fourth exemplary embodiment, the same elements as those in the first exemplary embodiment are given the same reference signs and will not be described.

As shown in FIG. 16, in the detection unit of the commodity promotion system 1 according to the fourth exemplary embodiment, a strip conductor 102*a* and two ground conductors 102*ag* are disposed on the front surface of a reader antenna 102 in such a manner that the strip conductor 102*a* is sandwiched between the ground conductors 102*g*. Also, as shown in FIGS. 17 and 18, in the detection unit of the commodity promotion system 1 according to the fourth exemplary embodiment, a ground conductor 102*g* is formed in a sheet form on the back surface of the reader antenna 102.

Compared to the microstripline of the first exemplary embodiment, this coplanar line is more likely to induce an electrical-field distribution on the front surface, and the reader antenna 102 and a tag antenna 112 are more likely to be electromagnetic-field-coupled accordingly. As shown in a side sectional view of FIG. 17, for example, the line-of-sight distance L2 from the strip conductor 102*a* to the tag antenna 112 is the distance from the strip conductor 102*a* to the tag antenna 112 in a region which can be seen by extending over the ground conductors 102*ag*. While an RF tag 104 and the strip conductor 102*a* are disposed below a target article 105, the detection unit of the commodity promotion system according to the fourth exemplary embodiment operates, for example, even in a state in which the detection unit is rotated by 90 degrees using the lower surface as a side wall surface. Further, the detection unit, of course, operates even when it is rotated by 180 degrees and thus the lower surface becomes the upper surface. That is, FIGS. 16 to 18 shown in the fourth exemplary embodiment are only illustrative of the relative positional relationship among the target article 105, RF tag 104 and strip conductor 102*a*.

Fifth Exemplary Embodiment

Figure 19:
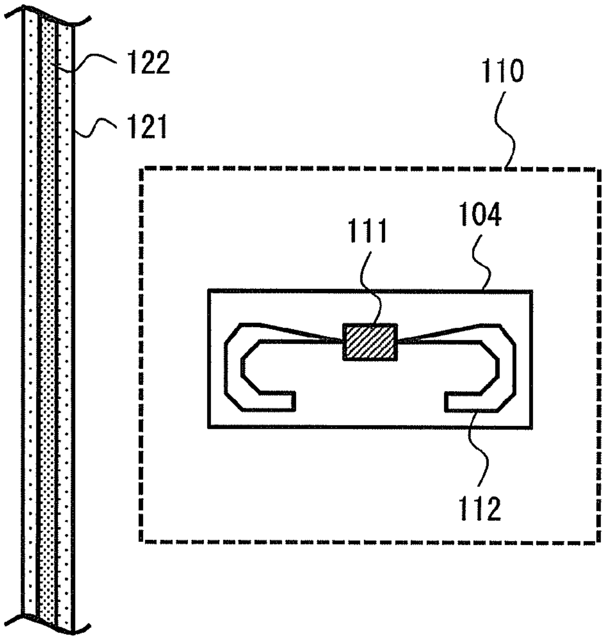
FIG. 19 is a top view of the commodity promotion system according to a fifth exemplary embodiment, which shows a placement of a target article and the positional relationship between a RF tag and a reader antenna in the commodity promotion system.
Figure 20:
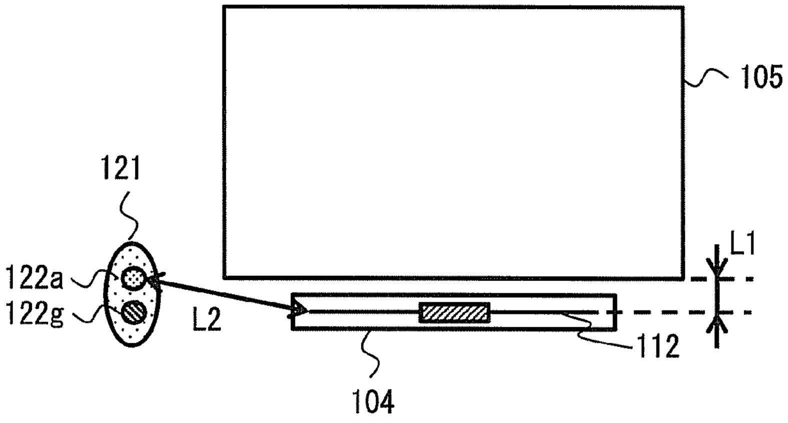
FIG. 20 is a front sectional view of the commodity promotion system according to the fifth exemplary embodiment, which shows a placement of a target article and the positional relationship between a RF tag and a reader antenna in the commodity promotion system.
Figure 21:
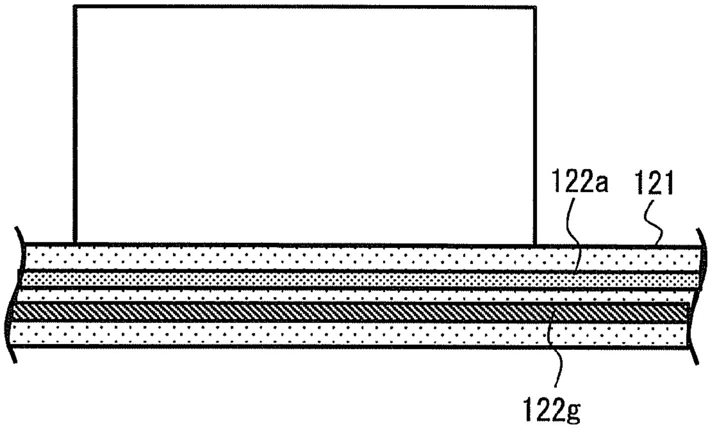
FIG. 21 is a side sectional view of the commodity promotion system according to the fifth exemplary embodiment, which shows a placement of a target article and the positional relationship between a RF tag and a reader antenna in the commodity promotion system.

In a fifth exemplary embodiment, there will be described an exemplary embodiment in which a balanced two-wire transmission line is used as a reader antenna 102 in the detection unit of a commodity promotion system. In the fifth exemplary embodiment, a feeder line consisting of two copper wires and serving as a balanced two-wire transmission line is used as an open transmission line, and this transmission line is used as a travelling-wave antenna. FIG. 19 shows a top view of a detection unit of a commodity promotion system according to the fifth exemplary embodiment; FIG. 20 shows a front sectional view of the detection unit of the commodity promotion system according to the fifth exemplary embodiment; and FIG. 21 shows a side sectional view of the detection unit of the commodity promotion system according to the fifth exemplary embodiment. A RFID reader is not shown in these drawings. In the fifth exemplary embodiment, the same elements as those in the first exemplary embodiment are given the same reference signs and will not be described.

As shown in FIG. 19, in the detection unit of the commodity promotion system according to the fifth exemplary embodiment, a feeder line 121 is disposed on a side of a target article 105 and an RF tag 104. As shown in FIGS. 20 and 21, in the detection unit of the commodity promotion system according to the fifth exemplary embodiment, the RF tag 104 is disposed below the target article 105. The RF tag 104 is disposed on an article management shelf, and a target article placement region is set above the RF tag 104. The feeder line 121 includes a lead wire 122*a* and a lead wire 122*b*. For example, the lead wire 122*a* and lead wire 122*b* are connected together at one end of the feeder line 121 through a matching terminator Rt (not shown). By making such connection, the feeder line 121 is matched-terminated. Connected to the other end of the feeder line 121 is an RFID reader 103 (not shown). Of course, an impedance converter, balance/imbalance converter, distributor, coupler, or the like may be optionally inserted between the feeder line 121 and matching terminator Rt or between the feeder line 121 and RFID reader 103.

As shown in FIGS. 19 to 21, in the detection unit of the commodity promotion system according to the fifth exemplary embodiment, the orientation of the RF tag 104 and the relative position of the RF tag 104 with respect to the feeder line 121 can be set extremely freely.

While the example in which one target article 105, one RF tag 104, and one feeder line 121 are disposed has been described in the fifth exemplary embodiment, the numbers of these elements are not limited to the example shown in FIGS. 19 to 21. Of course, one target article 105 may be detected by multiple RF tags 104, and multiple RF tags 104 may be read by one feeder line 121. The feeder line 121 used as a reader antenna basically serves as a transmission line. Accordingly, multiple feeder lines 121 may be connected together in series or in parallel as long as impedance matching is ensured. Further, n number of articles may be detected by m number of RF tags 104.

Sixth Exemplary Embodiment

Figure 22:
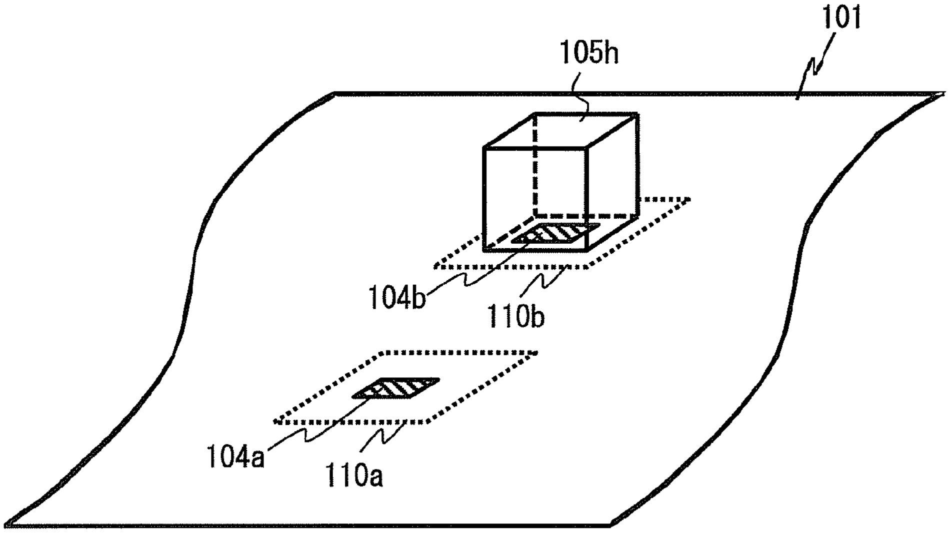
FIG. 22 is a schematic view of a commodity promotion system according to a sixth exemplary embodiment, which shows the placement of a target article.

In a sixth exemplary embodiment, there will be described an exemplary embodiment in which a coplanar slot line 142, which is a type of linear open transmission line, is disposed in a meandering manner. That is, the sixth exemplary embodiment is an exemplary embodiment in which the coplanar slot line 142 is used as a reader antenna 102. FIG. 22 shows the positions of a commodity and the like, and FIG. 23 shows a schematic view in which the coplanar slot line 142 corresponding to FIG. 22 is disposed in a meandering manner.

Figure 23:
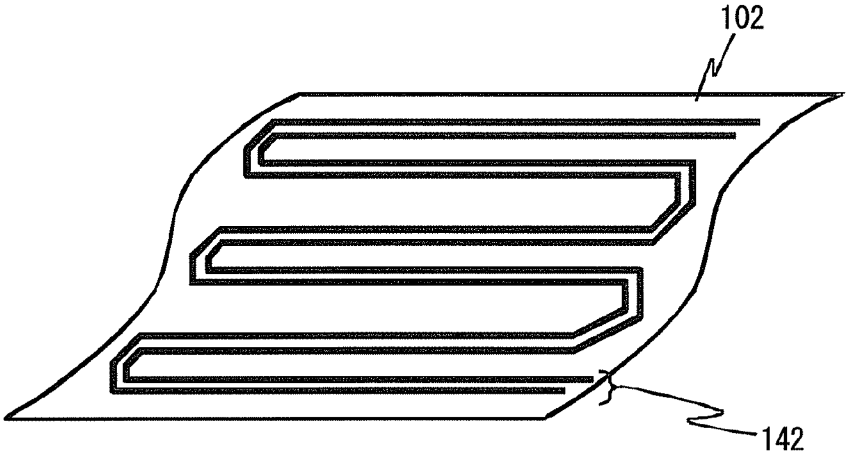
FIG. 23 is a schematic view of a coplanar slot line of the commodity promotion system according to the sixth exemplary embodiment.

As shown in FIG. 23, the coplanar slot line 142 is formed on the front surface of the reader antenna 102 in a predetermined meandering cycle. It is not desirable that the coplanar slot line 142 make positive radiation, unlike the crank-line antenna and meander-line antenna described above. This is because when the coplanar slot line 142 makes radiation in one area thereof, radiation loss is increased and the characteristic impedance of that area of the line significantly changes, thereby generating a standing wave. If the extension of the line is restricted for these reasons, the cover area would be reduced or a blind spot would be generated around a tag. These are undesirable. Accordingly, if the coplanar slot line 142 makes strong radiation due to the meandering cycle or the like, it is preferred to take a measure such as partially shielding of the coplanar slot line 142. As seen above, by disposing a linear open power transmission line in a desired meandering manner, it is possible to form a reader antenna 102 which covers a region having a desired shape or area.

Note that multiple reader antennas 102 may be connected in series to one RFID reader 103 or may be connected in parallel thereto using a distributor, or series connection and parallel connection may be combined. If reader antennas 102 are connected in series, the open transmission line of the traveling-wave antenna can be used as part of the cable and therefore the total length of the cable can be reduced. In this case, a distributor or the like is not used and therefore useless attenuation of a signal can be prevented. On the other hand, if reader antennas 102 are connected in parallel, the tags are prevented from being unevenly read due to repeated attenuation of a signal in the reader antennas and cable. Further, for parallel connection, multiple reader antennas may be switched and used in a time-division manner by disposing an antenna switch in place of a distributor and controlling the reader antennas from the RFID reader 103. In this case, by reducing the distances between the RF tag 104 and reader antennas to strengthen the coupling therebetween, the output of the RFID reader 103 can be reduced sufficiently. Alternatively, the reader antennas may be designed such that radiated electromagnetic fields therefrom are weakened. Thus, the distances over which the reader antennas recognize the RF tag 104 can be reduced. That is, the multiple adjacent reader antennas 102 can be prevented from reading the same RF tag 104. If the shelves are operated independently in this manner, when multiple reader antennas are used in a time division manner, the number of RF tags 104 which can be handled can be increased to a multiple of the number of reader antennas.

While the example in which a single reader antenna is disposed on a single shelf has been described in the above exemplary embodiments, the exemplary embodiments of the present invention are not limited to this example. For example, multiple reader antennas may be disposed on a single shelf. Further, continuous reader antennas may be formed by removing cables connecting reader antennas using the nature of the open transmission lines of the reader antennas. That is, a single reader antenna may be disposed on multiple shelves.

While the example in which RF tags 104 spread all over the upper surface of a reader antenna has been mainly described in the above exemplary embodiments, the present invention is not limited to this example. For example, if pieces of confectionery such as aluminum-packed chocolate, books, or the like are stacked flatly, RF tags 104 may be disposed on the wall surface of the shelf. In this case, the position of the reader antenna is also changed. RF tags 104 may also be disposed on the top plate of the shelf. For example, a roller-equipped shelf is often used in refrigerated showcases at convenience stores so that when a customer takes out a drink, the next drink moves forward automatically. In this case, RF tags 104 may be disposed side-by-side on the top plate of the showcase so that the RF tags detect drinks placed side-by-side therebelow.

Examples of a target article 105, whose presence or absence can be detected, include articles containing a metal material, for example, aluminum-packed snack food, tobacco, chocolate, and chewing gum. Articles containing water, which is a high-permittivity material, can also be detected, including drinks, rice balls, bread, deli, and packed lunches. According to an experiment, a bunch of thick paper sheets such as a book can also be detected.

While the present invention has been described assuming that a semiconductor chip is embedded in each RF tag 104, a chip-less RF tag, which has been developed in recent years, may be used. A chip-less RF tag refers to, for example, a tag which includes multiple resonators having different resonant frequencies and allows its several-bit ID number to be read wirelessly when a reader detects a combination of the resonant frequencies. In this case, when one target article 105 is absent, the ID of a chip-less tag corresponding to the target article 105 can be read; when the target article 105 is present, the ID cannot be read. Accordingly, the present invention is also applicable to such chip-less RF tags.

As seen above, the present invention can provide a commodity promotion system where no RF tags are attached to target articles; the positions of commodities are not limited to between a reader and tags; there is no need to ensure wide space between an RFID reader and RF tags; and there is reduced false detection due to a multipath phenomenon or entry of a human or object between a reader antenna and a region having an article placed thereon.

While the invention of the present application has been described with reference to the exemplary embodiments, the invention is not limited thereto. Various changes understandable by those skilled in the art can be made to the configuration or details of the invention of the present application without departing from the scope of the invention.

The present application claims priority based on Japanese Patent Application No. 2012-265536, filed on Dec. 4, 2012, the disclosure of which is incorporated herein in its entirety.

REFERENCE SIGNS LIST

1, 2 commodity promotion system
101 showcase
102 reader antenna
102*a* strip conductor
102*ag* ground conductor
102*g* ground conductor
102*m* mesh conductor
103 RFID reader
104 RF tag
105 target article
106 spacer
110 target article placement region
111 RFID chip
112 tag antenna
121 feeder line
122 copper wire
142 coplanar slot line
200 customer behavior analysis apparatus
201 commodity presence/absence determination unit
202, 212 storage unit
203 commodity information storage unit
204 commodity pickup determination unit
205, 214 communication unit
210 customer behavior analysis apparatus
211 customer attribute estimation unit
213 customer attribute information storage unit
300 detection unit
400 output unit
401, 501 communication unit
402 information presentation unit
500 additional information input unit
502 additional information acquisition unit
Rt matching terminator

The invention claimed is:

1. A commodity promotion system comprising:

a detection unit, the detection unit comprising:

a shelf including a reader antenna composed of a matched-terminated open transmission line, an RF tag including a tag antenna being electromagnetic-field-coupled with the reader antenna and stacked on top of the reader antenna, and a target article placement region for placing a target article on top of the RF tag such that the target article is electromagnetic-field-coupled with the tag antenna; and an RFID reader that reads management information from the RF tag through the reader antenna, the management information including signal strength information of a response signal output by the RF tag and tag information of the RF tag;

an output unit that presents a customer with information;

a commodity presence-absence determination unit that determines a presence or an absence of the target article on the basis of the signal strength information in the management information;

a commodity information storage unit that stores a commodity information list in which the tag information, commodity presence-absence information indicating the presence or the absence of the target article, output unit ID information for identifying the output unit, and output information indicating information to be presented are associated with one another; and a commodity pickup determination unit that detects that the target article has changed from a presence state to an absence state, on the basis of a determination result of the presence or the absence of the target article and the commodity presence-absence information in the commodity information list and outputs the output information associated with the tag information to the output unit, wherein the RF tag is placed at a predetermined location in a range that is electromagnetically coupled to the reader antenna and is visible from the reader antenna in a state where a management target article is placed in the vicinity of the RF tag, and the commodity promotion system varies characteristics of a reflection signal depending on a distance from the article.

2. The commodity promotion system according to claim 1, wherein the reader antenna transmits or receives a radio signal to or from the RF tag.

3. The commodity promotion system according to claim 1, wherein when signal strength indicated by the signal strength information is lower than a predetermined threshold, the commodity presence-absence determination unit determines that the target article is in a presence state.

4. The commodity promotion system according to claim 1, wherein the commodity information list further includes commodity identification information of the target article.

5. The commodity promotion system according to claim 1, further comprising:

an additional information input unit that acquires data used to estimate an attribute of a customer who has picked up the target article;

a customer attribute information storage unit that stores a database of the attribute of the customer; and a customer attribute estimation unit that estimates the attribute of the customer using the database and the data, wherein the commodity pickup determination unit selects, from the commodity information list, the output information corresponding to the customer attribute estimated by the customer attribute estimation unit and outputs the selected output information.

6. The commodity promotion system according to claim 5, wherein the additional information input unit outputs an image captured by a camera as the data.

7. The commodity promotion system according to claim 5, wherein information for identifying at least one of age and sex of the customer is described as the attribute of the customer in the database.

8. The commodity promotion system according to claim 1, wherein the output unit is a display device such as a display or electronic POP terminal.

9. A commodity promotion system comprising a detection unit, an arithmetic unit, a storage unit, and an output unit, the detection unit including a shelf, the shelf including a reader antenna composed oft a matched-terminated open transmission line, an RF tag including a tag antenna electromagnetic-field-coupled with the reader antenna, and stacked on top of the reader antenna, and a target article placement region for placing a target article on top of the RF tag such that the target article is electromagnetic-field-coupled with the tag antenna of the RF tag; and an RFID reader that reads management information from the RF tag through the reader antenna, the management information including signal strength information of a response signal output by the RF tag and tag information of the RF tag, the RF tag being placed at a predetermined location in a range that is electromagnetically coupled to the reader antenna and is visible from the reader antenna in a state where a management target article is placed in the vicinity of the RF tag, and the commodity promotion system varying characteristics of a reflection signal depending on a distance from the article, a non-transitory computer-readable medium storing a program executed by the arithmetic unit, wherein the program:

determines presence or absence of the target article on the basis of the signal strength information in the management information;

refers to a commodity information list stored in the storage unit, the commodity information list being a commodity information list in which the tag information, commodity presence-absence information indicating a presence or an absence of the target article, output unit ID information for identifying the output unit, and output information indicating information to be presented are associated with one another;

detects that the target article has changed from a presence state to an absence state, on the basis of a determination result of the presence or the absence of the target article and the commodity presence-absence information in the commodity information list;

outputs the output information associated with the tag information to the output unit; and presents a customer with information based on the output information through the output unit.

10. The commodity promotion system according to claim 6, wherein information for identifying at least one of age and sex of the customer is described as the attribute of the customer in the database.

11. The commodity promotion system according to claim 1, wherein the RF tag is separate from the target article.

* * * * *

UNITED STATES PATENT AND TRADEMARK OFFICE

CERTIFICATE OF CORRECTION

PATENT NO. : 10,079,998 B2
APPLICATION NO. : 14/441747
DATED : September 18, 2018
INVENTOR(S) : Koichiro Nakase and Wataru Hattori It is certified that error appears in the above-identified patent and that said Letters Patent is hereby corrected as shown below:

In the Specification

Column 13, Description of Embodiments, Line 13; “E [Vim]” has been replaced with --E [V/m]-- therefor Column 13, Description of Embodiments, Line 14; “H [Aim]” has been replaced with --H [A/m]-- therefor Column 20, Description of Embodiments, Line 6; “$L3<\lambda$,” has been replaced with --$L1\leq\lambda$,-- therefor Column 23, Description of Embodiments, Line 25; “$L2<\lambda/2\pi$” has been replaced with --$L2\leq\lambda/2\pi$-- therefor In the Claims Column 34, Claim 8, Line 19; “oft” has been replaced with --of-- therefor Signed and Sealed this
Twenty-second Day of January, 2019

Andrei Iancu
*Director of the United States Patent and Trademark Office*